US007068638B2

(12) United States Patent
Choi et al.

(10) Patent No.: US 7,068,638 B2
(45) Date of Patent: Jun. 27, 2006

(54) APPARATUS AND METHOD FOR CODING/DECODING TFCI BITS IN AN ASYNCHRONOUS CDMA COMMUNICATION SYSTEM

(75) Inventors: Sung-Ho Choi, Songnam-shi (KR); Jae-Yoel Kim, Kunpo-shi (KR); Hyun-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 980 days.

(21) Appl. No.: 10/085,776

(22) Filed: Feb. 27, 2002

(65) Prior Publication Data

US 2002/0162073 A1 Oct. 31, 2002

(30) Foreign Application Priority Data

Feb. 27, 2001 (KR) .............................. 2001-10150

(51) Int. Cl.
*H04B 7/216* (2006.01)

(52) U.S. Cl. ...................................... 370/342; 370/335

(58) Field of Classification Search ................ 370/342, 370/208, 335, 347, 241–242, 537, 442, 464; 455/466; 375/140
See application file for complete search history.

(56) References Cited

U.S. PATENT DOCUMENTS 6,094,428 A 7/2000 Bruckert et al.
6,813,506 B1 * 11/2004 Song .......................... 455/466
6,868,075 B1 * 3/2005 Narvinger et al. .......... 370/335
6,882,636 B1 * 4/2005 Kim et al. .................. 370/342
2001/0026543 A1 * 10/2001 Hwang et al. .............. 370/335
2001/0046220 A1 * 11/2001 Koo et al. .................. 370/335
2001/0053140 A1 * 12/2001 Choi et al. .................. 370/335
2003/0088819 A1 * 5/2003 Uga ........................... 714/752
2004/0015750 A1 * 1/2004 Obuchi et al. .............. 714/704
2005/0018614 A1 * 1/2005 Kiran ......................... 370/252

FOREIGN PATENT DOCUMENTS

EP 0 993 127 A1 4/2000
EP 1 104 130 A2 5/2001
EP 1 195 934 9/2001
JP 11088293 3/1999
WO WO 01/03366 A1 1/2001

OTHER PUBLICATIONS

TSG-RAN Working Group1 meeting #7 TSGR1#7(99)D69 Hanover, Germany, Aug. 30-Sep. 3, 1999 Agenda Item: Ad Hoc 4 Report and Text Proposal Source: Samsung Electronics Co. Ltd TFCI coding for FDD (rev. of R1-99b61).*

(Continued)

*Primary Examiner*—Seema S. Rao
*Assistant Examiner*—Salman Ahmed
(74) *Attorney, Agent, or Firm*—Dilworth & Barrese LLP

(57) ABSTRACT

A method for decoding received data in a decoder which receives data from an encoder varying a length of a Walsh code according to a coding rate of transmission data, and has maximum IFHT (Inverse Fast Hadamard Transform) stages capable of decoding even the data encoded by a Walsh code with a maximum length. The method comprises selecting at least one IFHT stage among the maximum IFHT stages according to a length of the Walsh code used for the received data; and performing inverse fast Hadamard transform on the received data by the selected IFHT stage.

8 Claims, 16 Drawing Sheets

OTHER PUBLICATIONS

TSG-RAN Working Group 1 meeting #5 TSGR(99)913 Helsinki, Filand Jul. 13-16, 1999 Agenda item: Source: Samsung Harmonization impact on TFCI and New Optimal Coding for extended TFCI with almost no Complexity increase.*

TSG-RAN Working Group 1 meeting #7 TSGR1#7(99)99b60 Hanover, Germany Aug. 30-Sep. 3, 1999 Agenda item: Source: Samsung New Optimal Coding for extended TFCI with almost no Complexity.*

Combined Search and Examination Report dated Aug. 15, 2003, issued in a counterpart application, namely, GB 0316983.6.

European Search Report dated Oct. 24, 2002 issued in a counterpart application, namely EP Appln. No. 02004550.6.

ETSI-RAN: Universal Mobile Telecommunications System (UMTS); Multiplexing and Channel Coding (FDD); Dec. 2000, pp. 1-64.

F. J. Macwilliams, N. J. A. Sloane, North-Holland, "The Theory of Error-Correcting Codes", Ch. 1, §§ 2-3, pp. 6-15.

* cited by examiner

Frame structure of downlink DPCH

APPARATUS AND METHOD FOR CODING/DECODING TFCI BITS IN AN ASYNCHRONOUS CDMA COMMUNICATION SYSTEM

This application claims priority to an application entitled "Apparatus and Method for Transmitting TFCI Bits in a CDMA Communication System" filed in the Korean Industrial Property Office on Feb. 27, 2001 and assigned Ser. No. 2001-10150, the contents of which are hereby incorporated by reference.

BACKGROUND OF THE INVENTION

1. Field of the Invention

The present invention relates generally to an CDMA mobile communication system, and in particular, to an apparatus and method for transmitting TFCI (Transport Format Combination Indicator) bits used during data transmission over a downlink shared channel in an CDMA mobile communication system.

2. Description of the Related Art

In a mobile communication system, a plurality of users located in the same cell share a downlink shared channel (DSCH) on a time-division basis. The DSCH is established in association with a dedicated channel (DCH) of every user. The DCH includes a dedicated physical control channel (DPCCH) and a dedicated physical data channel (DPDCH). In particular, the DPCCH is also used as a physical control channel for the DSCH. Therefore, the DPCCH transmits control signals of the associated DCH and DSCH. The control signals include a TFCI (Transport Format Combination Indicator) that is transmitted by encoding 10-bit information into 30 bits. That is, information on an amount of data is expressed by 10 bits, and the 10-bit information is encoded into 30 bits for transmission over a physical channel. Therefore, the DPCCH should simultaneously transmit TFCI for the DCH and TFCI for the DSCH. Herein, TFCI for the DCH will be referred to as TFCI field#1 or first TFCI, and TFCI for the DSCH will be referred to as TFCI field#2 or second TFCI.

A method for simultaneously transmitting the TFCI field#1 and the TFCI field#2 over the DPCCH is divided into two methods: a hard split method and a logical split method.

In the logical split method, one TFCI comprised of the TFCI field#1 and the TFCI field#2 in a specific ratio is encoded into 30 coded symbols with a (30,10) punctured Reed-Muller code (or sub-code second order Reed-Muller code). A ratio of the TFCI field#1 to the TFCI field#2 is one of 1:9, 2:8, 3:7, 4:6, 5:5, 6:4, 7:3, 8:2 and 9:1.

In the hard split method, a 5-bit TFCI field#1 and a 5-bit TFCI field#2 are encoded with a (15,5) punctured bi-orthogonal code, and then multiplexed into 30 coded symbols.

FIG. 1 illustrates a structure of a transmitter based on the hard split method. Referring to FIG. 1, a (15,5) bi-orthogonal encoder 100 encodes a 5-bit TFCI field#1 for the DCH into 15 coded symbols with a (15,5) punctured bi-orthogonal code, and provides the 15 coded symbols to a multiplexer 110. At the same time, a (15,5) bi-orthogonal encoder 105 encodes a 5-bit TFCI field#2 for the DSCH into 15 coded symbols with the (15,5) punctured bi-orthogonal code, and also provides the 15 coded symbols to the multiplexer 110. The multiplexer 110 then time-multiplexes the 15 coded symbols from the encoder 100 and the 15 coded symbols from the encoder 105, and outputs 30 symbols after arrangement. A multiplexer 120 time-multiplexes the 30 symbols output from the multiplexer 110 and other signals (for example: Transmission Power Control bits (TPC), Pilot bits, and data bits), and provides its output to a spreader 130. The spreader 130 spreads the output signal of the multiplexer 120 with a spreading code provided from a spreading code generator 135. A scrambler 140 scrambles the spread signal with a scrambling code provided from a scrambling code generator 145.

FIG. 2 illustrates a procedure for exchanging signaling messages and data between a Node B and RNCs (Radio Network Controllers) for the hard split method defined in the existing 3 GPP (3rd Generation Partnership Project). Referring to FIG. 2, if transmission data of the DSCH is generated, a radio link controller (RLC) 11 of an SRNC (Serving RNC) 10 transmits the DSCH data to a MAC-D (Medium Access Control-Dedicated channel) 13 of the SRNC 10 in step 101. A primitive transmitted at this moment is MAC-D-Data-REQ. In step 102, the MAC-D 13 of the SRNC 10 transmits DSCH data received from the RLC 11 to a MAC-CSH (MAC-Common/Shared channel) 21 of a CRNC (Control RNC) 20. A primitive transmitted at this moment is MAC-CSH-Data-REQ. In step 103, the MAC-C 21 of the CRNC 20 determines (schedules) a transmission time for the DSCH data received in the step 102 from the MAC-D 13 of the SRNC 10, and then, transmits the DSCH data along with its associated TFI (Transport Format Indicator) to an L1 (Layer 1) 30 of a Node B (hereinafter, the term "Node B" refers to a base station). A primitive transmitted at this moment is MPHY-Data-REQ. In step 104, the MAC-D 13 of the SRNC 10 transmits transmission data of the DCH and its associated TFI to the L1 30 of the Node B. A primitive transmitted at this moment is MPHY-Data-REQ. The data transmitted in the step 103 is independent of the data transmitted in the step 104, and the L1 30 of the Node B generates a TFCI that is divided into a TFCI for the DCH and a TFCI for the DSCH. In the steps 103 and 104, the data and the TFIs are transmitted using a data frame protocol.

After receiving the data and the TFIs in the steps 103 and 104, the L1 30 of the Node B transmits the DSCH data over a physical DSCH (PDSCH) to an L1 41 of a UE (User Equipment; hereinafter, the term "UE" refers to a mobile station) 40 in step 105. In step 106, the L1 30 of the Node B transmits the TFCI to the L1 41 of the UE 40 using the DPCH. The L1 30 of the Node B transmits the TFCIs created with the TFIs received in the steps 103 and 104, using the fields for the DCH and the DSCH.

FIG. 3 illustrates a procedure for exchanging signaling messages and data between a Node B and an RNC for the logical split method. Referring to FIG. 3, if DSCH data to be transmitted is generated, an RLC 301 of an RNC 300 transmits the DSCH data to a MAC-D 303 of the RNC 300 in step 201. A primitive transmitted at this moment is MAC-D-Data-REQ. Upon receipt of the DSCH data from the RLC 301, the MAC-D 303 transmits the DSCH data to a MAC-C/SH (MAC-Common/Shared channel) 305 in step 202. A primitive transmitted at this moment is MAC-C/SH-Data-REQ. Upon receipt of the DSCH data, the MAC-C/SH 305 determines a transmission time of the DSCH data and then transmits a TFCI associated with the DSCH data to MAC-D 303 in step 203. After transmitting the TFCI to the MAC-D 303 in the step 203, the MAC-C/SH 305 transmits the DSCH data to an L1 307 of the Node B in step 204. The DSCH data is transmitted at the time determined (scheduled) in the step 203. Upon receipt of the TFCI for the DSCH data transmitted from the MAC-C/SH 305 in the step 203, the MAC-D 303 determines a TFCI for the DSCH and transmits the TFCI to the L1 307 of the Node B in step 205. A primitive transmitted at this moment is MPHY-Data-REQ.

After transmitting the TFCI for the DSCH, the MAC-D 303 determines a TFCI for the DCH and transmits the DCH data along with the TFCI for the DCH to the L1 307 of the Node B in step 206. A primitive transmitted at this moment is MPHY-Data-REQ. The DSCH data transmitted in the step 204 and the TFCI transmitted in the step 205 are related to the time determined in the step 203. That is, the TFCI in the step 205 is transmitted to a UE 310 over the DPCCH at a frame immediately before the DSCH data in the step 204 is transmitted over the PDSCH. In the steps 204, 205 and 206, the data and the TFCIs are transmitted using a frame protocol. Particularly, in the step 206, the TFCI is transmitted through a control frame. In step 207, the L1 307 of the Node B transmits the DSCH data over the PDSCH to an L1 311 of the UE 310. In step 208, the L1 307 of the Node B creates a TFCI using the respective TFCIs or TFIs received in the steps 205 and 206, and transmits the created TFCI to the L1 311 using the DPCCH.

Summarizing the logical split method, the MAC-C/SH 305 transmits DSCH scheduling information and TFCI information of the DSCH to the MAC-D 303 in the step 203. This is because in order to encode the TFCI for the DSCH and the TFCI for the DCH in the same coding method, the MAC-D 303 must simultaneously transmit the DSCH scheduling information and the TFCI information to the L1 307 of the Node B. Therefore, when the MAC-D 303 has data to transmit, a delay occurs until the MAC-D 303 receives the scheduling information and the TFCI information from the MAC-C/SH 305 after transmitting the data to the MAC-C/SH 305. In addition, when the MAC-C/SH 305 is separated from the MAC-D 303 on the lur, i.e., when the MAC-C/SH 305 exists in the DRNC (Drift RNC) and the MAC-D 303 exists in the SRNC, the scheduling information and the TFCI information are exchanged on the lur, causing an increase in the delay.

Compared with the logical split method, the hard split method can reduce the delay because information transmission to the MAC-D is not required after scheduling in the MAC-C/SH. This is possible because the Node B can independently encode the TFCI for the DCH and the TFCI for the DSCH in the hard split method. In addition, when the MAC-C/SH is separated from the MAC-D on the lur, i.e., when the MAC-C/SH exists in the DRNC and the MAC-D exists in the SRNC, the scheduling information is not exchanged on the lur, preventing an increase in the delay. However, according to the foregoing description, the information amounts (bits) of the TFCIs for the DCH and the DSCH are fixedly divided in a ratio of 5 bits to 5 bits, so that it is possible to express a maximum of 32 information for the DCH and the DSCH, respectively. Therefore, if there are more than 32 sorts of information for the DSCH or DCH, the hard split method cannot be used.

SUMMARY OF THE INVENTION

It is, therefore, an object of the present invention to provide an apparatus and method for adaptively calculating correlations of TFCI for a DCH and TFCI for a DSCH transmitted in a different ratio according to coding rates.

It is another object of the present invention to provide an apparatus and method for optimally receiving a TFCI using an inverse fast Hadamard transformer for a Walsh code.

It is further another object of the present invention to provide an apparatus and method for measuring a correlation with minimal calculations according to an amount of TFCI information received.

It is yet another object of the present invention to provide an apparatus and method for dividing a correlation calculating process by inverse fast Hadamard transform into several steps, and then selectively performing only some of the steps according to an amount of received information.

It is still another object of the present invention to provide an apparatus and method for dividing a correlation calculating process by inverse fast Hadamard transform into several steps, and simplifying calculations performed in the respective steps.

To achieve the above and other objects, the present invention provides a method for decoding received data in a decoder which receives data from an encoder varying a length of a coded bits according to a coding rate of transmission data, and has maximum IFHT (Inverse Fast Hadamard Transform) stages capable of decoding even the data encoded by a code with a certain length. The method comprises selecting at least one IFHT stage among the maximum IFHT stages according to a length of the coded bits used for the received data, and performing inverse fast Hadamard transform on the received data by the selected IFHT stage.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
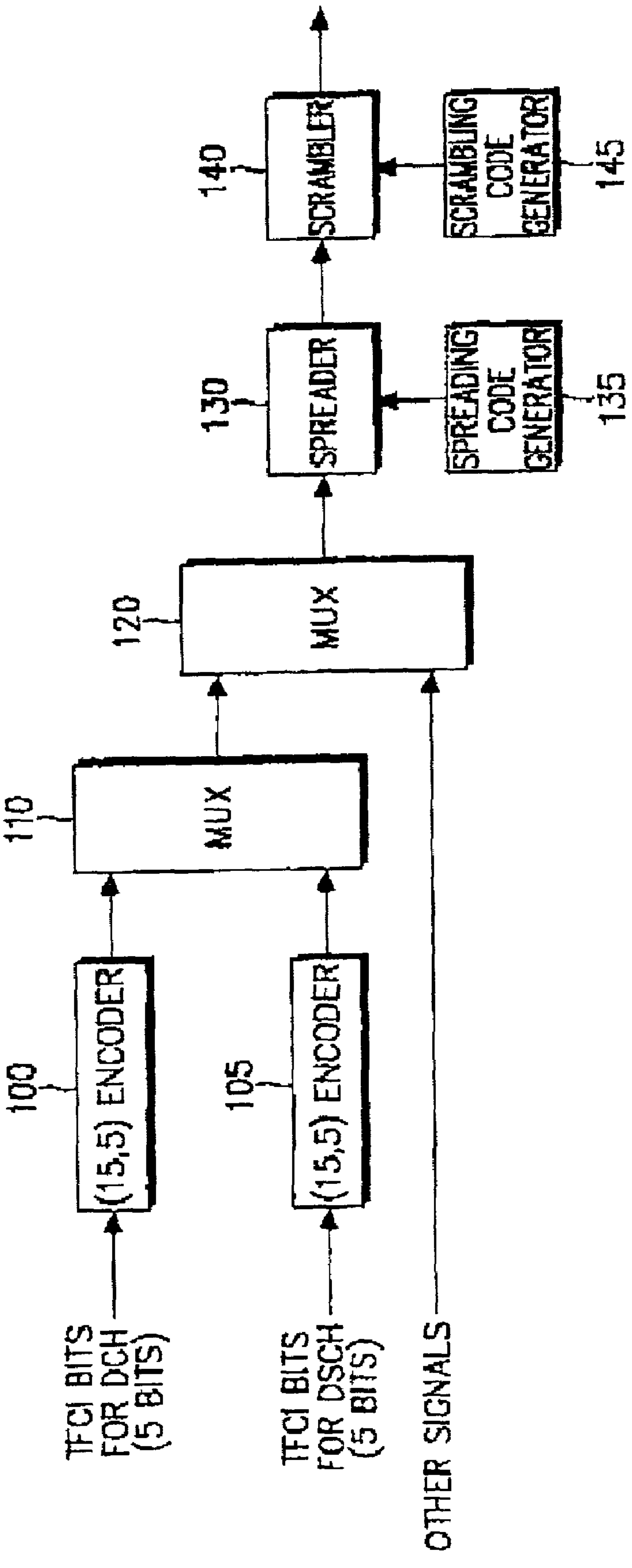
FIG. 1 is a diagram illustrating a structure of a transmitter having a (15,5) encoder based on a hard split technique in a general CDMA mobile communication system.
Figure 2:
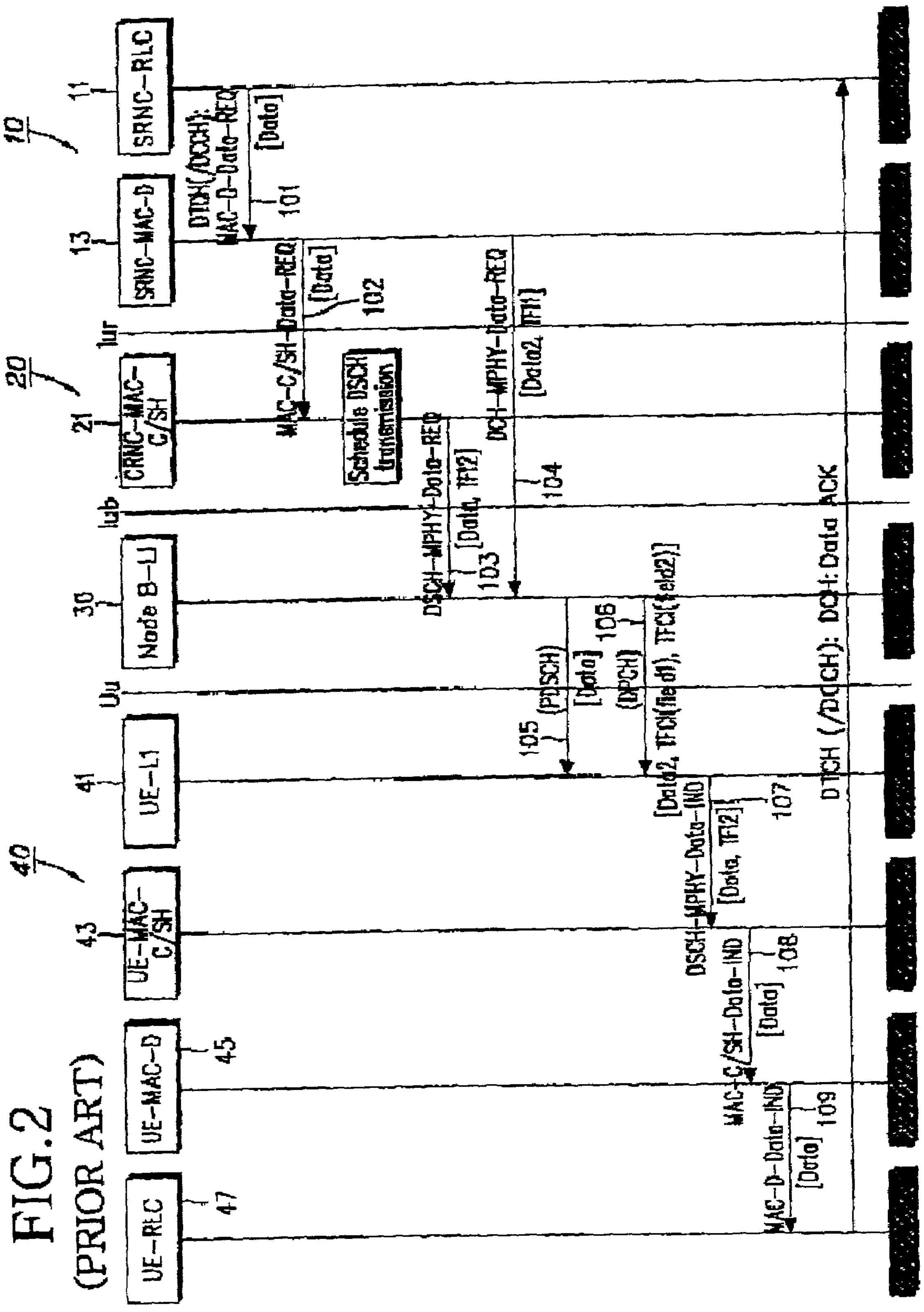
FIG. 2 is a flow diagram illustrating a procedure for exchanging signaling messages and data between a Node B and radio network controllers (RNCs) for the hard split technique in the general CDMA mobile communication system.
Figure 3:
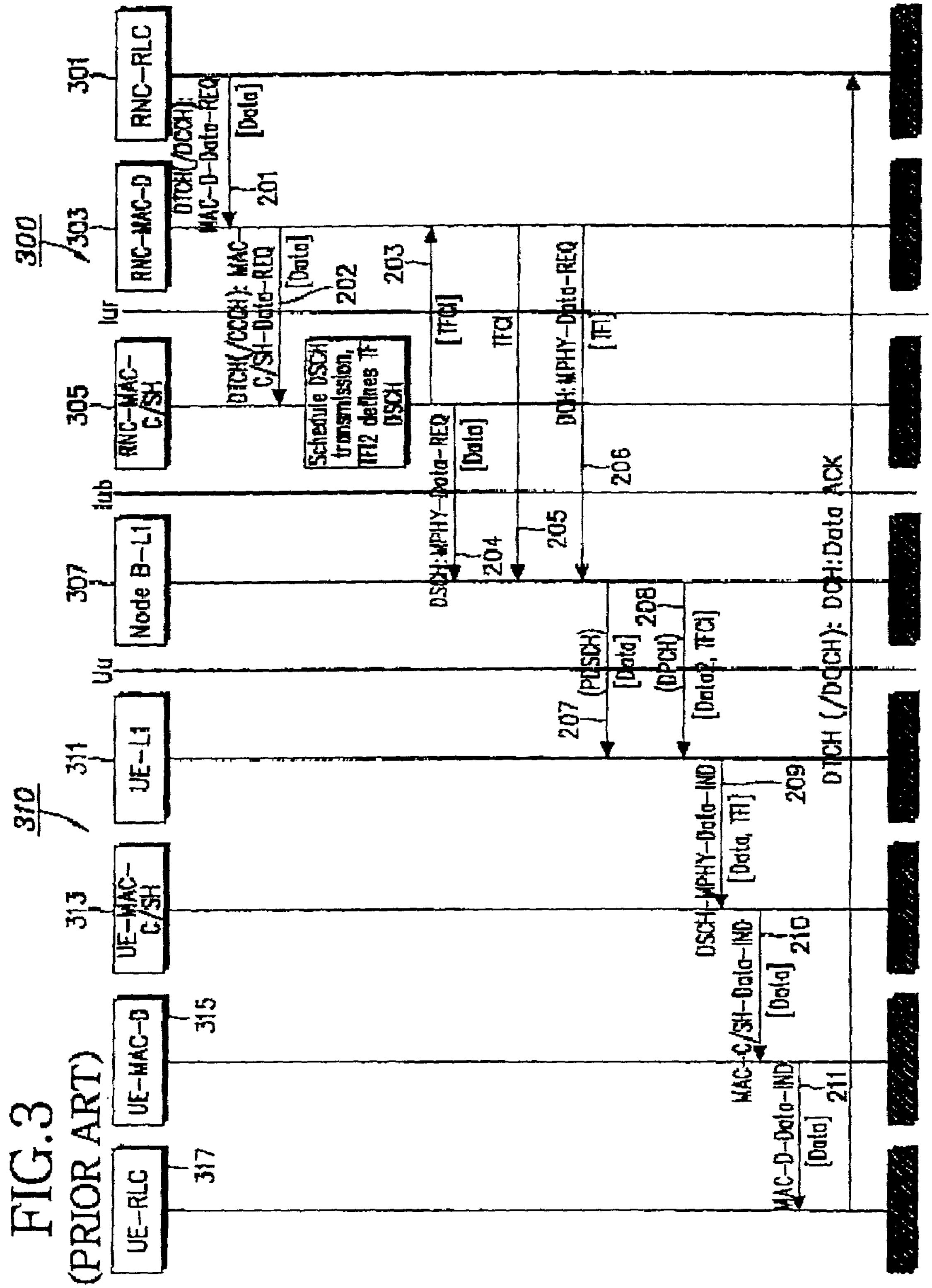
FIG. 3 is a flow diagram illustrating a procedure for exchanging signaling messages and data between a Node B and RNCs for a logical split technique in the general asynchronous CDMA mobile communication system.

A preferred embodiment of the present invention will be described herein below with reference to the accompanying drawings. In the following description, well-known functions or constructions are not described in detail since they would obscure the invention in unnecessary detail.

In the case of the hard split technique, the number of information bits for the DSCH and the DCH is 10 in total, and the 10 information bits are divided in a ratio of 1:9, 2:8, 3:7, 4:6 5:5, 6:4, 7:3, 8:2, or 9:1 for the DSCH and the DCH, and then subjected to coding.

A physical layer transmits 30 coded TFCI symbols for one frame at a coding rate 1/3. When the TFCI information bits are divided in a specific ratio as stated above, it is preferable to divide the coded symbols in the same ratio as the specific ratio, thereby maintaining the respective coding rates. For example, when 10 input bits are divided in a ratio of 1:9, the 30 output symbols are divided in a ratio of 3:27. When the 10 input bits are divided in a ratio of 2:8, the 30 output symbols are divided in a ratio of 6:24. When the 10 input bits are divided in a ratio of 3:7, the 30 output symbols are divided in a ratio of 9:21. When the 10 input bits are divided in a ratio of 4:6, the 30 output symbols are divided in a ratio of 12:18, and so on.

Therefore, when a ratio of the information bits is 1:9, a (3,1) encoder for outputting 3 coded symbols by receiving 1 input bit and a (27,9) encoder for outputting 27 coded symbols by receiving 9 input bits are required. When a ratio of the information bits is 2:8, a (6,2) encoder for outputting 6 coded symbols by receiving 2 input bits and a (24,8) encoder for outputting 24 coded symbols by receiving 8 input bits are required. When a ratio of the information bits is 3:7, a (9,3) encoder for outputting 9 coded symbols by receiving 3 input bits and a (21,7) encoder for outputting 21 coded symbols by receiving 7 input bits are required. When a ratio of the information bits is 4:6, a (12,4) encoder for outputting 12 coded symbols by receiving 4 input bits and an (18,6) encoder for outputting 18 coded symbols by receiving 6 input bits are required, and so on. Therefore, in order for the 10 encoders to have high performance and low hardware complexity, they are required to operate in the same manner.

In general, the performance of linear error correcting codes is measured by Hamming distance distribution in the error correcting codewords. The Hamming distance is defined as the number of non-zero symbols in each codeword. For a codeword "0111", its Hamming distance is 3. The minimum Hamming distance is called a minimum distance $d_{min}$. As the minimum distance increases, the linear error correcting code has superior error correcting performance. For details, see "The Theory of Error-Correcting Codes", F. J. Macwilliams, N. J. A. Sloane, North-Holland.

In addition, for the low hardware complexity, it is preferable to shorten a code with the longest length, i.e., a (32,10) code in order to operate the encoders with different lengths in the same structure. It is necessary to puncture the coded symbol in order to shorten the (32,10) code. In puncturing the (32,10) code, the minimum distance of the code undergoes a change according to the puncturing position. Therefore, it is preferable to calculate the puncturing position such that the punctured code has an optimal minimum distance.

For example, with an optimal (6,2) code, it is most preferable to repeat a (3,2) simplex code twice among the above codes in terms of the minimum distance. Table 1 illustrates the relationship between the input information bits of the (3,2) simplex code and the output (3,2) simplex codewords.

TABLE 1

| Input Information Bits | (3,2) Simplex Codewords |
|---|---|
| 00 | 000 |
| 01 | 101 |
| 10 | 011 |
| 11 | 110 |

If the (3,2) simplex codewords are repeated twice, the relationship the input information bits and the output (3,2) simplex codewords is illustrated in Table 2.

TABLE 2

| Input Information Bits | Twice-Repeated (3,2) Simplex Codewords |
|---|---|
| 00 | 000 000 |
| 01 | 101 101 |
| 10 | 011 011 |
| 11 | 110 110 |

However, the twice-repeated (3,2) simplex codewords can be implemented by shortening the existing (16,4) Reed-Muller code. Describing an example of the shortening method, the (16,4) Reed-Muller code is a linear combination of 4 basis codewords of length 16, where '4' is the number of input information bits. Receiving only 2 bits among the 4 input information bits is equivalent to using a linear combination of only 2 basis codewords among the 4 basis codewords of length 16 and not using the remaining codewords. In addition, by restricting the use of the basis codewords and then puncturing 10 symbols among 16 symbols, it is possible to operate the (16,4) encoder as a (6,2) encoder. Table 3 illustrates the shortening method.

TABLE 3

| Input Info Bits | Codewords | | | | | | | | | | | | | | | |
|---|---|---|---|---|---|---|---|---|---|---|---|---|---|---|---|---|
| 0000 | 0(*) | 0 | 0 | 0 | 0(*) | 0 | 0 | 0 | 0(*) | 0(*) | 0(*) | 0(*) | 0(*) | 0(*) | 0(*) | 0(*) |
| 0001 | 0(*) | 1 | 0 | 1 | 0(*) | 1 | 0 | 1 | 0(*) | 1(*) | 0(*) | 1(*) | 0(*) | 1(*) | 0(*) | 1(*) |
| 0010 | 0(*) | 0 | 1 | 1 | 0(*) | 0 | 1 | 1 | 0(*) | 0(*) | 1(*) | 1(*) | 0(*) | 0(*) | 1(*) | 1(*) |
| 0011 | 0(*) | 1 | 0 | 0 | 0(*) | 1 | 1 | 0 | 0(*) | 1(*) | 1(*) | 0(*) | 0(*) | 1(*) | 1(*) | 0(*) |
| 0100 | 0 | 0 | 0 | 0 | 1 | 1 | 1 | 1 | 0 | 0 | 0 | 0 | 1 | 1 | 1 | 1 |
| 0101 | 0 | 1 | 0 | 1 | 1 | 0 | 1 | 0 | 0 | 1 | 0 | 1 | 1 | 0 | 1 | 0 |
| 0110 | 0 | 0 | 1 | 1 | 1 | 1 | 0 | 0 | 0 | 0 | 1 | 1 | 1 | 1 | 0 | 0 |
| 0111 | 0 | 1 | 1 | 0 | 1 | 0 | 0 | 1 | 0 | 1 | 1 | 0 | 1 | 0 | 0 | 1 |
| 1000 | 0 | 0 | 0 | 0 | 0 | 0 | 0 | 0 | 1 | 1 | 1 | 1 | 1 | 1 | 1 | 1 |
| 1001 | 0 | 1 | 0 | 1 | 0 | 1 | 0 | 1 | 1 | 0 | 1 | 0 | 1 | 0 | 1 | 0 |
| 1010 | 0 | 0 | 1 | 1 | 0 | 0 | 1 | 1 | 1 | 1 | 0 | 0 | 1 | 1 | 0 | 0 |
| 1011 | 0 | 1 | 1 | 0 | 0 | 1 | 1 | 0 | 1 | 0 | 0 | 1 | 1 | 0 | 0 | 1 |
| 1100 | 0 | 0 | 0 | 0 | 1 | 1 | 1 | 1 | 1 | 1 | 1 | 1 | 0 | 0 | 0 | 0 |
| 1101 | 0 | 1 | 0 | 1 | 1 | 0 | 1 | 0 | 1 | 0 | 1 | 0 | 0 | 1 | 0 | 1 |
| 1110 | 0 | 0 | 1 | 1 | 1 | 1 | 0 | 0 | 1 | 1 | 0 | 0 | 0 | 0 | 1 | 1 |
| 1111 | 0 | 1 | 1 | 0 | 1 | 0 | 0 | 1 | 1 | 0 | 0 | 1 | 0 | 1 | 1 | 0 |

Referring to Table 3, every (16,4) codeword is a linear combination of the 4 bold basis codewords of length 16. In order to obtain the (6,2) code, only the upper 2 codewords among the 4 basis codewords are used. Then, the remaining lower 12 codewords are automatically unused and only the upper 4 codewords are used. Besides, in order to convert the upper 4 codewords into codewords length 6, it is necessary to puncture 10 symbols. It is possible to obtain the twice-repeated (3,2) simplex codewords shown in Table 2 by puncturing the symbols indicated by (*) in Table 3 and then collecting the remaining 6 coded symbols. Herein, a description will be made of a structure of an encoder for creating a (3,1) optimal code and a (27,9) optimal code used for the information bit (amount) ratio of 1:9, a structure of an encoder for creating a (6,2) optimal code and a (24,8) optimal code used for the information bit ratio of 2:8, a structure of an encoder for creating a (9,3) optimal code and a (21,7) optimal code used for the information bit ratio of 3:7, a structure of an encoder for creating a (12,4) optimal code and an (18,6) optimal code used for the information bit ratio of 4:6, and a structure of an encoder for creating a (15,5) optimal code and a (15,5) optimal code used for the information bit ratio of 5:5, by shortening a (32,10) sub-code of the second order Reed-Muller code. In addition, a structure of a decoder corresponding to the encoder will also be described herein below.

1. Structure and Operation of Transmitter

An exemplary embodiment of the present invention provides an apparatus and method for dividing 10 information bits in a ratio of 1:9, 2:8, 3:7, 4:6, 5:5, 6:4, 7:3, 8:2 or 9:1 before coding even in the hard split mode, as done in the logical split mode.

Figure 4:
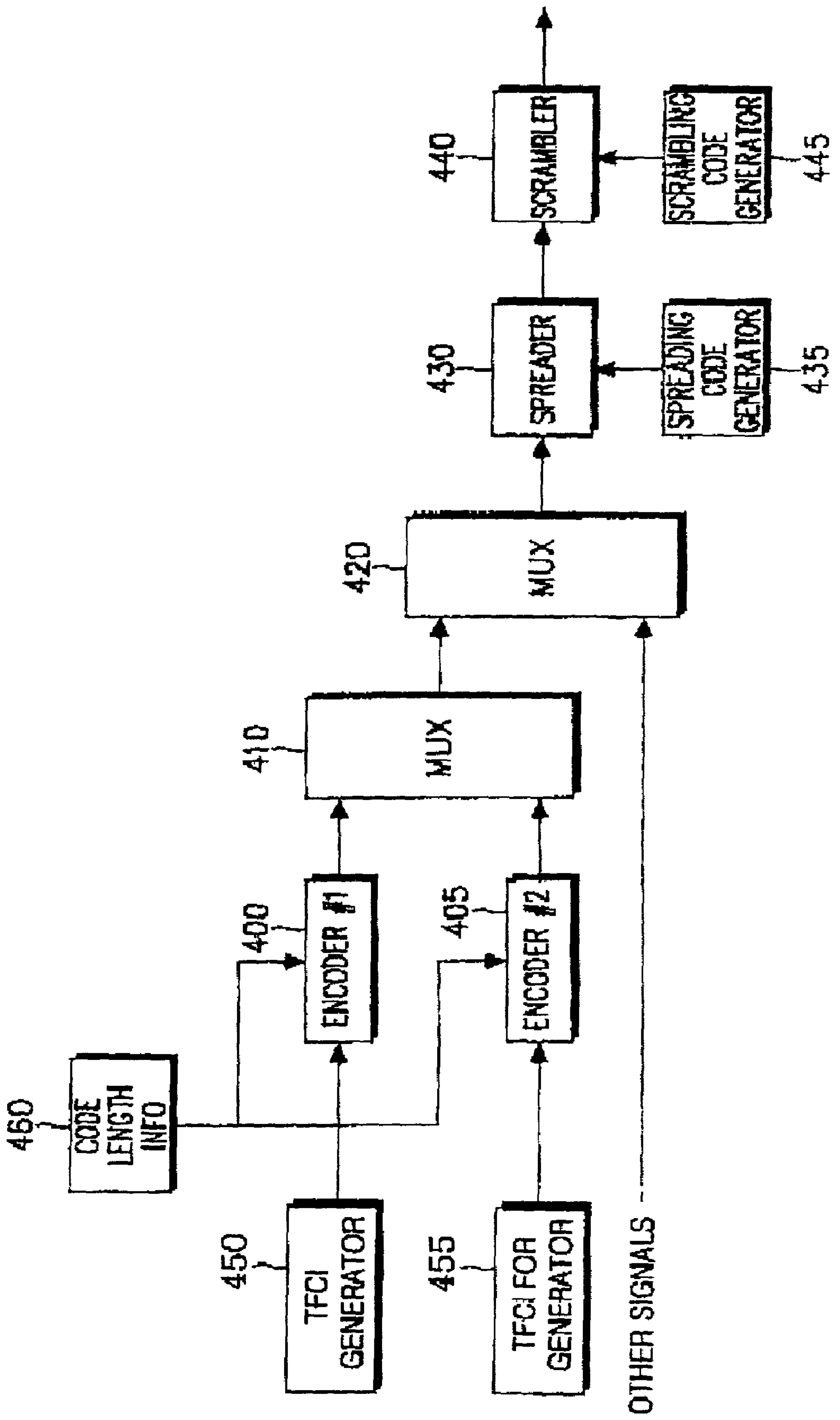
FIG. 4 is a block diagram illustrating a structure of a transmitter for encoding TFCI bits for the DSCH and TFCI bits for the DCH using different encoding techniques according to an embodiment of the present invention.

FIG. 4 illustrates a structure of a transmitter according to an embodiment of the present invention. Referring to FIG. 4, TFCI bits for the DSCH and TFCI bits for the DCH, divided according to the information bit ratio, are provided to first and second encoders 400 and 405, respectively. Here, the TFCI bits for the DSCH are referred to as a TFCI field#1 or first TFCI bits, while the TFCI bits for the DCH are referred to as a TFCI field#2 or second TFCI bits. The TFCI bits for the DSCH are generated from a first TFCI bit generator 450, and the TFCI bits for the DCH are generated from a second TFCI bit generator 455. The first and second TFCI bits create new TFCI bits having the different ratios stated above, according to their information bit ratio. In addition, a control signal indicating code length information, i.e., information on a length value of the codeword set according to the information bit ratio, is provided to the first and second encoders 400 and 405. The code length information is generated from a code length information generator 460, and has a value variable according to lengths of the first TFCI bits and the second TFCI bits.

When the information bit ratio is 6:4, the encoder 400 receives the 6-bit TFCI for the DSCH and outputs 18 coded symbols in response to a control signal for allowing the encoder 400 to operate as an (18,6) encoder for outputting an 18-symbol codeword by receiving 6 input bits, while the encoder 405 receives the 4-bit TFCI for the DCH and outputs 12 coded symbols in response to a control signal for allowing the encoder 405 to operate as a (12,4) encoder for outputting a 12-symbol codeword by receiving 4 input bits. When the information bit ratio is 7:, the encoder 400 receives the 7-bit TFCI for the DSCH and outputs 21 coded symbols in response to a control signal for allowing the encoder 400 to operate as a (21,7) encoder for outputting a 21-symbol codeword by receiving 7 input bits, while the encoder 405 receives the 3-bit TFCI for the DCH and outputs 9 coded symbols in response to a control signal for allowing the encoder 405 to operate as a (9,3) encoder for outputting a 9-symbol codeword by receiving 3 input bits. When the information bit ratio is 8:2, the encoder 400 receives the 8-bit TFCI for the DSCH and outputs 24 coded symbols in response to a control signal for allowing the encoder 400 to operate as a (24,8) encoder for outputting a 24-symbol codeword by receiving 8 input bits, while the encoder 405 receives the 2-bit TFCI for the DCH and outputs 6 coded symbols in response to a control signal for allowing the encoder 405 to operate as a (6,2) encoder for outputting a 6-symbol codeword by receiving 2 input bits. When the information bit ratio is 9:1, the encoder 400 receives the 9-bit TFCI for the DSCH and outputs 27 coded symbols in response to a control signal for allowing the encoder 400 to operate as a (27,9) encoder for outputting a 27-symbol codeword by receiving 9 input bits, while the encoder 405 receives the 1-bit TFCI for the DCH and outputs 3 coded symbols in response to a control signal for allowing the encoder 405 to operate as a (3,1) encoder for outputting a 3-symbol codeword by receiving 1 input bit, and so on.

Figure 5:
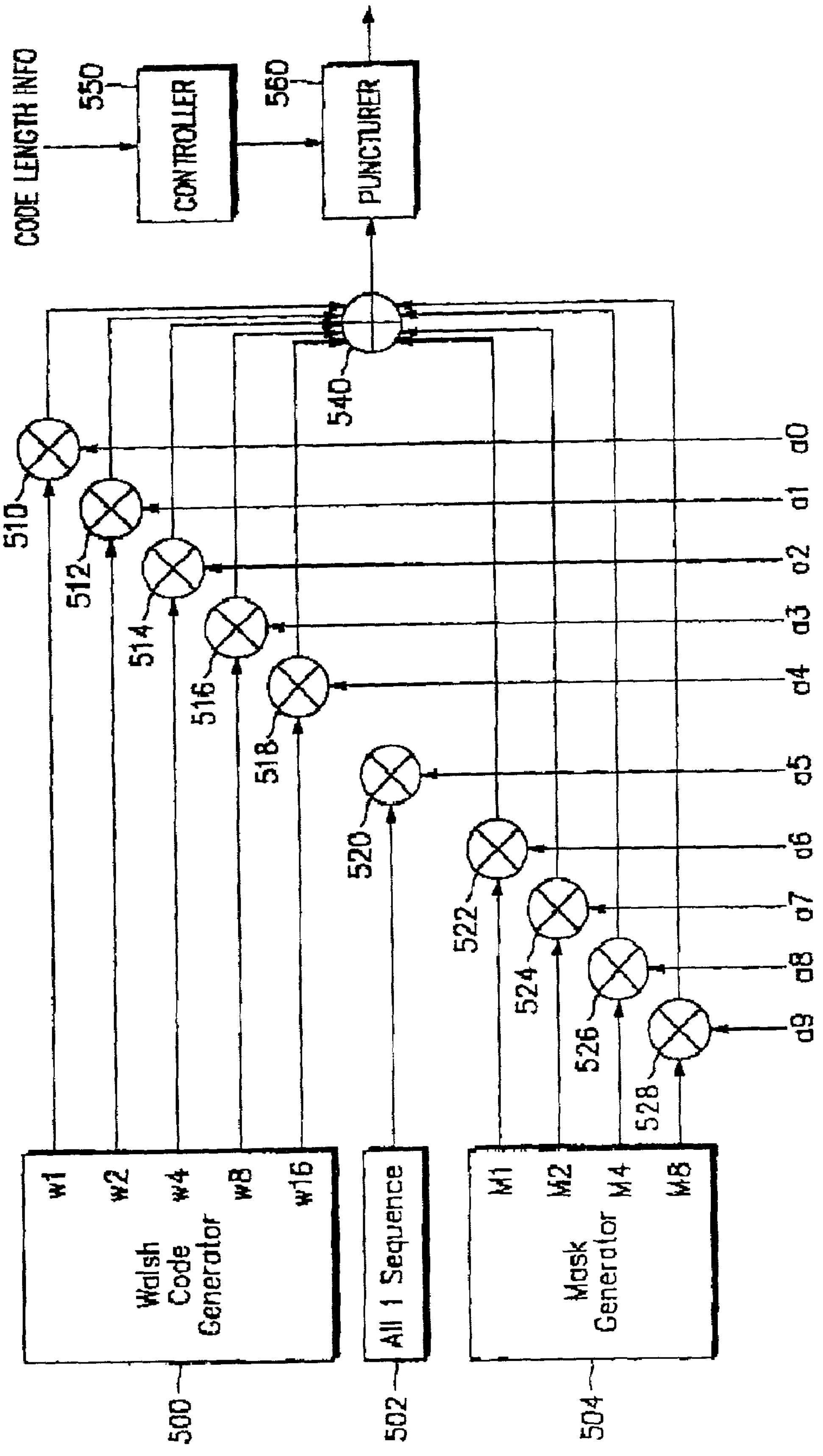
FIG. 5 is a detailed diagram illustrating the encoder shown in FIG. 4.

FIG. 5 illustrates a detailed structure of the encoders 400 and 405. An operation of the encoders will be described for the respective information bit ratios.

1) Information Bit Ratio=1:9

For the information bit ratio of 1:9, the encoder 400 serves as a (3,1) encoder, while the encoder 405 serves as a (27,9) encoder. Therefore, operations of the encoders 400 and 405 will be separately described below, with an operation of the encoder 400 being described first.

One input bit is provided to the encoder 400 as an input bit a0, and at the same time, the remaining input bits a1, a2, a3, a4, a5, a6, a7, a8 and a9 are all filled with '0'. The input a0 is applied to a multiplier 510, the input bit a1 to a multiplier 512, the input bit a2 to a multiplier 514, the input bit a3 to a multiplier 516, the input bit a4 to a multiplier 518, the input bit a5 to a multiplier 520, the input bit a6 to a multiplier 522, the input bit a7 to a multiplier 524, the input bit a8 to a multiplier 526, and the input bit a9 to a multiplier 528. At the same time, a Walsh code generator 500 generates a basis codeword W1=10101010101010110101010101010100. The multiplier 510 then multiplies the input a0 by the basis codeword W1 in a symbol unit, and provides its output to an exclusive OR (XOR) operator 540. Further, the Walsh code generator 500 generates other basis codewords W2, W4, W8 and W16, and provides them to the multiplier 512, 514, 516 and 518, respectively. An all-1 code generator 502 generates an all-1 basis codeword and provides the generated all-1 basis codeword to the multiplier 520.

A mask generator 504 generates basis codewords M1, M2, M4 and M8, and provides the generated basis codewords M1, M2, M4 and M8 to the multipliers 522, 524, 526 and 528, respectively. However, since the input bits a1, a2, a3, a4, a5, a6, a7, a8 and a9 applied to the multipliers 512, 514, 516, 518, 520, 522, 524, 526 and 528 are all 0s, the multipliers 512, 514, 516, 518, 520, 522, 524, 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to the output value of the multiplier 510. The 32 symbols output from the exclusive OR operator 540 are provided to a puncturer 560.

At this moment, a controller 550 receives code length information and provides the puncturer 560 with a control signal indicating puncturing positions based on the code length. The puncturer 560 then punctures $0^{th}$, $1^{st}$; $3^{rd}$, $6^{\ th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $25^{th}$, $26^{th}$, $27^{th}$, $28^{th}$, $29^{th}$ ,$30^{th}$, $31^{st}$ coded symbols among a total of 32 coded symbols of $0^{th}$ to $31^{th}$ symbols according to the control signal output from the controller 550. In other words, the puncturer 560 punctures 29 symbols among 32 coded symbols, and thus outputs 3 non-punctured coded symbols.

In an operation of the encoder 405, nine input bits are provided to the encoder 405 as the input bits a0, a1, a2, a3, a4, a5, a6, a7 and a8, and at the same time, the remaining input bit a9 is filled with '0'. The input a0 is applied to the multiplier 510, the input bit a1 to the multiplier 512, the input bit b2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011011011001100110011001100, the multiplier 514 with the basis codeword W4=00011110000111100011110000111100, the multiplier

516 with the basis codeword W8=00000001111111100000001111111100, and the multiplier 518 with the basis codeword W16=00000000000000011111111111111101. Then, the multiplier 510 multiplies the basis codeword W1 by the input a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540.

Further, the mask generator 504 provides the multiplier 522 with the basis codeword M1=0101 0000 1100 0111 1100 0001 1101 1101, the multiplier 524 with the basis codeword M2=0000 0011 1001 1011 1011 0111 0001 1100, and the multiplier 526 with the basis codeword M4=0001 0101 1111 0010 0110 1100 1010 1100. Then, the multiplier 522 multiplies the basis codeword M1 by the input bit a6 in the symbol unit and provides its output to the exclusive OR operator 540, the multiplier 524 multiplies the basis codeword M2 by the input bit a7 in the symbol unit and provides its output to the exclusive OR operator 540, and the multiplier 526 multiplies the basis codeword M4 by the input bit a8 in the symbol unit and provides its output to the exclusive OR operator 540. Further, the mask generator 504 generates the basis codeword M8, and provides the generated basis codeword M8 to the multiplier 528. However, since the input bit a9 applied to the multiplier 528 is 0, the multiplier 528 outputs 0 to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518, 520, 522, 524 and 526. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $0^{th}$, $2^{nd}$, $8^{th}$, $19^{th}$ and $20^{th}$ coded symbols among a total of 32 coded symbols of $0^{th}$ to $31^{st}$ symbols according to the control signal output from the controller 550. In other words, the puncturer 560 punctures 5 symbols among 32 coded symbols, and thus outputs 27 non-punctured coded symbols.

2) Information Bit Ratio=2:8

For the information bit ratio of 2:8, the encoder 400 serves as a (6,2) encoder, while the encoder 405 serves as a (24,8) encoder. Therefore, operations of the encoders 400 and 405 will be separately described below, with an operation of the encoder 400 being described first.

Two input bits are provided to the encoder 400 as the input bits a0 and a1, and at the same time, the remaining input bits a2, a3, a4, a5, a6, a7, a8 and a9 are all filled with '0'. The input a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, and the multiplier 512 with the basis codeword W2=01100110011001101100110011001100. The multiplier 510 multiplies the basis codeword W1 by the input a0 in the symbol unit and provides its output to the exclusive OR operator 540, and the multiplier 512 multiplies the basis codeword W2 by the input bit a1 in the symbol unit and provides its output to the exclusive OR operator 540. Further, the Walsh code generator 500 generates other basis codewords W4, W8 and W16, and provides them to the multipliers 514, 516 and 518, respectively. The all-1 code generator 502 generates an all-1 basis codeword and provides the generated all-1 basis codeword to the multiplier 520.

The mask generator 504 generates the basis codewords M1, M2, M4 and M8, and provides the generated basis codewords M1, M2, M4 and M8 to the multipliers 522, 524, 526 and 528, respectively. However, since the input bits a2, a3, a4, a5, a6, a7, a8 and a9 applied to the multipliers 514, 516, 518, 520, 522, 524, 526 and 528 are all 0s, the multipliers 514, 516, 518, 520, 522, 524, 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510 and 512. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $3^{rd}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $27^{th}$, $28^{th}$, $29^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 26 symbols among 32 coded symbols, and thus outputs 6 non-punctured coded symbols.

In an operation of the encoder 405, eight input bits are provided to the encoder 405 as the input bits a0, a1, a2, a3, a4, a5, a6 and a7, and at the same time, the remaining input bits a8 and a9 are filled with ‘0’. The input a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111100000001111111100, and the multiplier 518 with the basis codeword W16=00000000000000011111111111111101. Then, the multiplier 510 multiplies the basis codeword W1 by the input a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540.

Further, the mask generator 504 provides the multiplier 522 with the basis codeword M1=0101 0000 1100 0111 1100 0001 1101 1101, and the multiplier 524 with the basis codeword M2=0000 0011 1001 1011 1011 0111 0001 1100. The multiplier 522 then multiplies the basis codeword M1 by the input bit a6 in the symbol unit and provides its output to the exclusive OR operator 540, and the multiplier 524 multiplies the basis codeword M2 by the input bit a7 in the symbol unit and provides its output to the exclusive OR operator 540. Further, the mask generator 504 generates the basis codewords M4 and M8, and provides the generated basis codewords M4 and M8 to the multipliers 526 and 528, respectively. However, since the input bits a8 and a9 applied to the multipliers 526 and 528 are all 0s, the multipliers 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518, 520, 522 and 524. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $1^{st}$,$7^{th}$, $13^{th}$, $15^{th}$, $20^{th}$, $25^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 8 symbols among 32 coded symbols, and thus outputs 24 non-punctured coded symbols.

3) Information Bit Ratio=3:7

For the information bit ratio of 3:7, the encoder 400 serves as a (9,3) encoder, while the encoder 405 serves as a (21,7) encoder. Therefore, operations of the encoders 400 and 405 will be separately described below, with an operation of the encoder 400 being described first.

Three input bits are provided to the encoder 400 as the input bits a0, a1 and a2, and at the same time, the remaining input bits a3, a4, a5, a6, a7, a8 and a9 are all filled with ‘0’. The input a0 is applied to the multiplier 510, the input bit al to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W11010101010101011010101010101010100, the multiplier 512 with the basis codeword W2=01100110011001101100110011001100, and the multiplier 514 with the basis codeword W4=00011110000111100011110000111100. The multiplier 510 then multiplies the basis codeword W1 by the input a0 in the symbol unit and provides its output to the exclusive OR operator 540, the multiplier 512 multiplies the basis codeword W2 by the input bit a1 in the symbol unit and provides its output to the exclusive OR operator 540, and the multiplier 514 multiplies the basis codeword W4 by the input bit a2 in the symbol unit and provides its output to the exclusive OR operator 540. Further, the Walsh code generator 500 generates other basis codewords W8 and W16, and provides them to the multipliers 516 and 518, respectively. The all-1 code generator 502 generates an all-1 basis codeword and provides the generated all-1 basis codeword to the multiplier 520.

The mask generator 504 generates the basis codewords M1, M2, M4 and M8, and provides the generated basis codewords M1, M2, M4 and M8 to the multipliers 522, 524, 526 and 528, respectively. However, since the input bits a3, a4, a5, a6, a7, a8 and a9 applied to the multipliers 516, 518, 520, 522, 524, 526 and 528 are all 0s, the multipliers 516, 518, 520, 522, 524, 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512 and 514. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $7^{th}$, $8^{th}$, $11^{th}$, $12^{th}$, $13^{th}$ $14^{th}$, $15^{th}$, $16^{th}$, $17^{th}$, $18^{th}$, $19^{th}$, $20^{th}$ , $21^{st}$, $22^{nd}$, $23^{rd}$, $24^{th}$, $25^{th}$, $26^{th}$, $27^{th}$, $28^{th}$, $29^{th}$ , $30^{th}$ and $31^{st}$ coded symbols among a total of 32 coded symbols of $0^{th}$ to $31^{st}$ symbols according to the control signal output from the controller 550. In other words, the puncturer 560 punctures 23 symbols among 32 coded symbols, and thus outputs 9 non-punctured coded symbols.

In an operation of the encoder 405, seven input bits are provided to the encoder 405 as the input bits a0, a1, a2, a3, a4, a5 and a6, and at the same time, the remaining input bits a7, a8 and a9 are filled with '0'. The input a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W432 00011110000111100011110000111100, the multiplier 516 with the basis codeword W8=00000001111111100000001111111100, and the multiplier 518 with the basis codeword W16=00000000000000011111111111111101. Then, the multiplier 510 multiplies the basis codeword W1 by the input a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540.

Further, the mask generator 504 provides the multiplier 522 with the basis codeword M1=0101 0000 1100 0111 1100 0001 1101 1101. The multiplier 522 then multiplies the basis codeword M1 by the input bit a6 in the symbol unit and provides its output to the exclusive OR operator 540. Further, the mask generator 504 generates the basis codewords M2, M4 and M8, and provides the generated basis codewords M2, M4 and M8 to the multipliers 524, 526 and 528, respectively. However, since the input bits a7, a8 and a9 applied to the multipliers 524, 526 and 528 are all 0s, the multipliers 524, 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518, 520 and 522. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $0^{th}$, $1^{st}$, $2^{nd}$, $3^{rd}$, $4^{th}$, $5^{th}$, $7^{th}$, $12^{th}$, $18^{th}$,$21^{st}$, $24^{th}$ coded symbols among a total of 32 coded symbols of $0^{th}$ to $31^{th}$ symbols according to the control signal output from the controller 550. In other words, the puncturer 560 punctures 11 symbols among 32 coded symbols, and thus outputs 21 non-punctured coded symbols.

4) Information Bit Ratio=4:6

For the information bit ratio of 4:6, the encoder 400 serves as a (12,4) encoder, while the encoder 405 serves as a (18,6) encoder. Therefore, operations of the encoders 400 and 405 will be separately described below, with an operation of the encoder 400 being described first.

Four input bits are provided to the encoder 400 as the input bits a0, a1, a2 and a3, and at the same time, the remaining input bits a4, a5, a6, a7, a8 and a9 are all filled with '0'. The input a0 is applied to the multiplier 510, the input bit al to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W11010101010101011010101010101010100, the multiplier 512 with the basis codeword W2=01100110011001101100110011001100, the multiplier

514 with the basis codeword W4=00011110000111100011110000111100, and the multiplier 516 with the basis codeword W8=0000000111111110000000 1111111100. The multiplier 510 then multiplies the basis codeword W1 by the input a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, and the multiplier 516 multiplies the basis codeword W8 by the input bit a3 in the symbol unit and provides its output to the exclusive OR operator 540. Further, the Walsh code generator 500 generates the other basis codeword W16, and provides it to the multiplier 518. The all-1 code generator 502 generates an all-1 basis codeword and provides the generated all-1 basis codeword to the multiplier 520.

The mask generator 504 generates the basis codewords M1, M2, M4 and M8, and provides the generated basis codewords M1, M2, M4 and M8 to the multipliers 522, 524, 526 and 528, respectively. However, since the input bits a4, a5, a6, a7, a8 and a9 applied to the multipliers 518, 520, 522, 524, 526 and 528 are all 0s, the multipliers 518, 520, 522, 524, 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514 and 516. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $0^{th}$,$1^{st}$, $2^{nd}$, $15^{th}$, $16^{th}$, $17^{th}$, $18^{th}$, $19^{th}$, $20^{th}$, $21^{th}$, $22^{nd}$, $23^{rd}$, $24^{th}$,$25^{th}$, $26^{th}$, $27^{th}$, $28^{th}$, $29^{th}$, $30^{th}$, and $31^{th}$ coded symbols among a total of 32 coded symbols of $0^{th}$ to $31^{st}$ symbols according to the control signal output from the controller 550. In other words, the puncturer 560 punctures 20 symbols among 32 coded symbols, and thus outputs 12 non-punctured coded symbols.

In an operation of the encoder 405, six input bits are provided to the encoder 405 as the input bits a0, a1, a2, a3, a4 and a5, and at the same time, the remaining input bits a6, a7, a8 and a9 are filled with '0'. The input a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111100000000111111100, and the multiplier 518 with the basis codeword W16=00000000000000011111111111111101. Then, the multiplier 510 multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540.

Further, the mask generator 504 generates the basis codewords M1, M2, M4 and M8, and provides the generated basis codewords M1, M2, M4 and M8 to the multipliers 522, 524, 526 and 528, respectively. However, since the input bits a6, a7, a8 and a9 applied to the multipliers 522, 524, 526 and 528 are all 0s, the multipliers 522, 524, 526 and 528 output 0s to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518 and 520. The 32 symbols output from the exclusive OR operator 540 are provided to the puncturer 560.

At this moment, the controller 550 receives code length information and provides the puncturer 560 with a control signal indicating puncturing positions based on the code length. The puncturer 560 then punctures $0^{th}$, $7^{th}$, $9^{th}$, $11^{th}$, $16^{th}$, $19^{th}$ , $24^{th}$, $25^{th}$, $26^{th}$, $27^{th}$, $28^{th}$, $29^{th}$, $30^{th}$ and $31^{st}$ code symbols among a total of 32 coded symbols of $0^{th}$ to $31^{st}$ symbols according to the control signal output from the controller 550. In other words, the puncturer 560 punctures 14 symbols among 32 coded symbols, and thus outputs 18 non-punctured coded symbols.

Above, the operations of the encoders 400 and 405 have been described for the information bit ratios of 9:1, 8:2, 7:3 and 6:4. After the above operations, the coded symbols output from the encoders 400 and 405 are time-multiplexed by a multiplexer 410, thus outputting a multiplexed 30-symbol signal.

Next, a description will be made as to how the multiplexer 410 multiplexes the encoded DSCH and DCH. The multiplexer 410 multiplexes the coded symbols output from the encoders 400 and 405 such that the 30 coded symbols are arranged as uniformly as possible.

In the following description, the TFCI for the DCH and the TFCI for the DSCH are assumed to be comprised of m bits and n bits, respectively. A possible ratio of m to n is (m:n)=1:9, 2:8, 3:7, 4:6, 5:5, 6:4, 7:3, 8:2 or 9:1.

First, a case of m>n will be considered. Even in the case of n>m, it is possible to arrange the TFCI bits for the DCH and the DSCH in the following manner through an interchange of n and m.

In the coding method described herein above, when the TFCIs for the DCH and the DSCH are respectively comprised of m bits and n bits, then the numbers of created bits after the coding are m*3 and n*3, respectively. Therefore, in order to select the positions for transmitting the created coded symbols, the 30 bits to be transmitted over the DPCCH are divided by 10 bits, and then m bits determined by dividing the m*3 bits for the DCH into 3 equal parts and n bits determined by dividing the n*3 bits into 3 equal parts are arranged.

Next, a description will be made of a method for arranging the m bits for the DCH and the n bits for the DSCH using given 10 bits.

Let L indicate an $L^{th}$ bit of the 10 bits.

Lets define F(k), G(k).

$$F(k) = \left\lfloor \frac{m}{n} * k \right\rfloor, \quad k = 0, 1, 2, \ldots, n \tag{1}$$

$$G(k) = \left\lceil \frac{F(k) - F(k-1)}{2} \right\rceil, \quad k = 0, 1, 2, \ldots, n \tag{2}$$

In Equations (1) and (2), $\lfloor x \rfloor$ indicates a maximum value among the integers smaller than or equal to a given value x, and $\lfloor x \rfloor$ indicates a minimum value among the integers larger than or equal to the given value x.

In Equation (2), F(−1) is defined as zero (0). That is, F(−1)=0. A method for arranging the m bits for the DCH and the n bits for the DSCH using the above formulas is defined by Equation (3) below. The bits for the DSCH are sequentially arranged to n L values among the 10 L values.

$$L=F(l-1)+G(l)+l \tag{3}$$

In Equation (3), l ($1 \leqq l \leqq n$) indicates an $l^{th}$ bit among the n bits for the DSCH. Therefore, Equation (3) is used in calculating a value corresponding to th $l^{th}$ position among the 10 bits for the DSCH.

The m bits for the DCH are arranged to L values other than the values given by Equation (3) among the 10 L values. This is defined by Equation (4) below.

$$F(l-2)+G(l-1)l \leqq L \leqq F(l-1)+G(l)+l-1 \tag{4}$$

In Equation (4), the value l has a range of $1 \leqq l \leqq n$.

Table 4 below illustrates F(k) and G(k) for the respective cases of m:n=9:1, 8:2, 7:3, 6:4 and 5:5.

TABLE 4

| m:n | F(k)<br>G(k)<br>TFCI bit Position for DSCH | F(1)<br>G(1) | F(2)<br>G(2) | F(3)<br>G(3) | F(4)<br>G(4) | F(5)<br>G(5) |
|---|---|---|---|---|---|---|
| | 5:5 | 1 | 2 | 3 | 4 | 5 |
| | | 1 | 1 | 1 | 1 | 1 |
| | | 2 | 4 | 6 | 8 | 10 |
| | 6:4 | 1 | 3 | 4 | 6 | |
| | | 1 | 1 | 1 | 1 | |
| | | 2 | 4 | 7 | 9 | |
| | 7:3 | 2 | 4 | 7 | | |
| | | 1 | 1 | 1 | | |
| | | 2 | 5 | 8 | | |
| | 8:2 | 4 | 8 | | | |
| | | 2 | 2 | | | |
| | | 3 | 8 | | | |
| | 9:1 | 9 | | | | |
| | | 4 | | | | |
| | | 5 | | | | |

Figure 9:
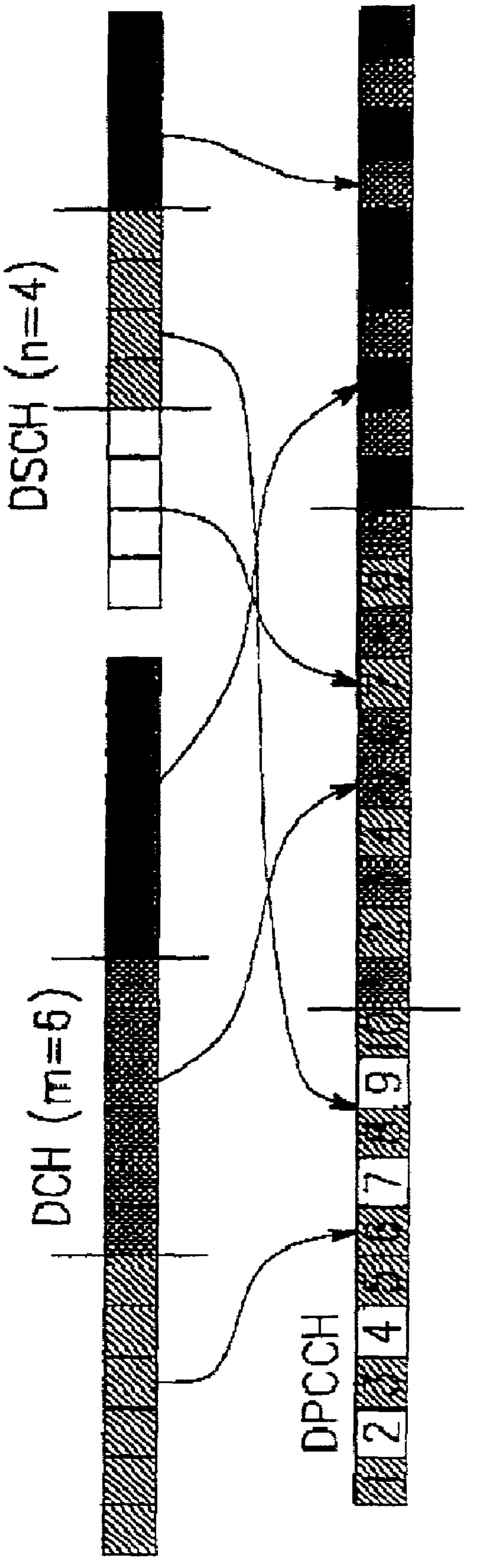
FIG. 9 is a diagram illustrating a method for multiplexing coded symbols encoded using different coding techniques.

FIG. 9 is a diagram illustrating how to match the TFCI bits for the DCH and the TFCI bits for the DSCH to 30 DPCCH bits, for m:n=6:4. As illustrated in Table 4 , for m:n=6:4, the position of the DSCH corresponds to the case where the L values are 2, 4, 7 and 9.

Figure 8:
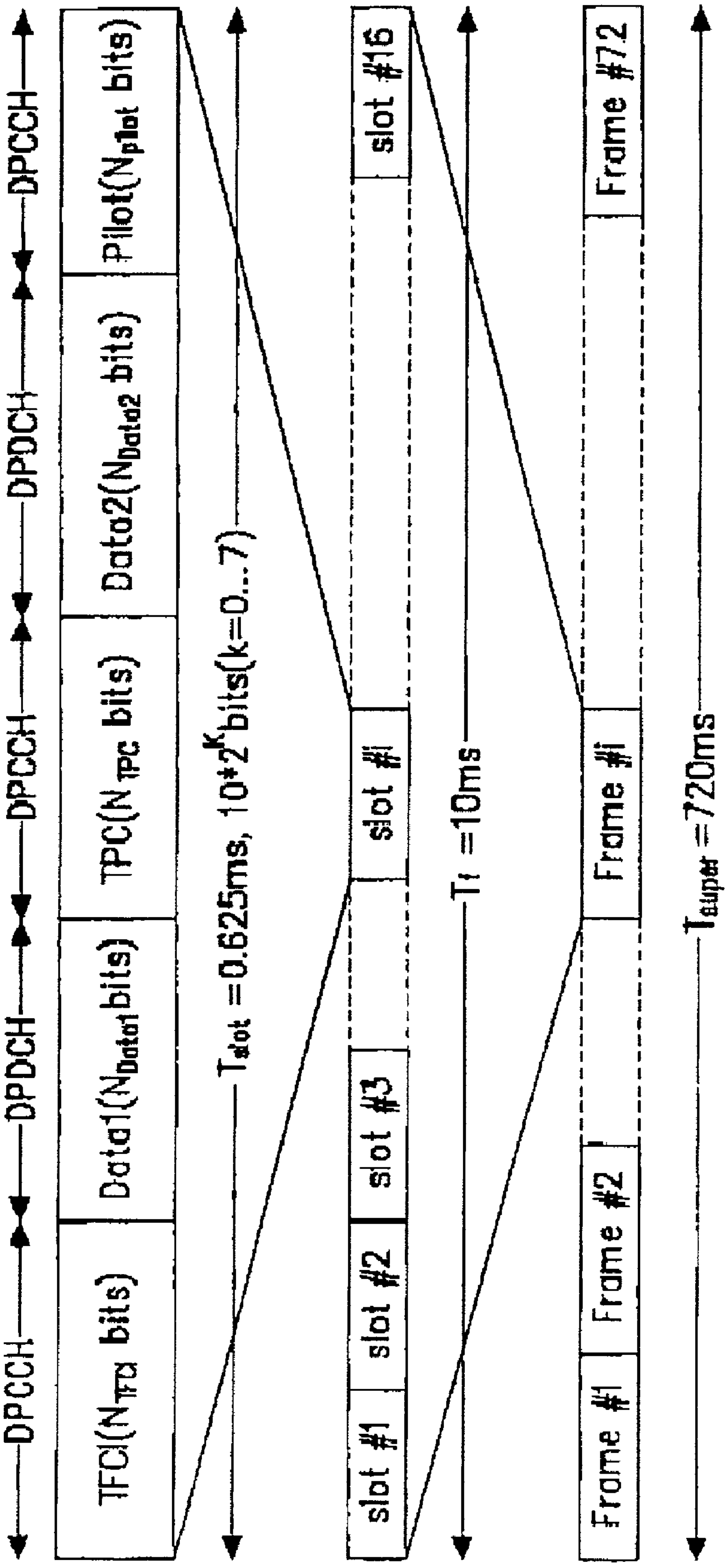
FIG. 8 is a diagram illustrating a signal transport format for a downlink DCH.

The muliplexed signals are then applied to a multiplexer 420 where they are time-multiplexed with other signals, such as transport power control (TPC) bits and pilot bits as shown in FIG. 8. A spreader 430 channel-spreads the multiplexed symbols with a spreading code provided from a spreading code generator 435 in a symbol unit for channelization, and outputs the channel-spread signals in a chip unit. A scrambler 440 scrambles the channel-spread signals with a scrambling code provided from a scrambling code generator 445.

2. Structure and Operation of Receiver

A description will now be made of a receiver corresponding to the transmitter that performs encoding at a variable coding rate in transmitting TFCI bits for the DSCH and TFCI bits for the DCH in a specific ratio. The receiver includes a decoder for decoding received symbols encoded at the variable coding rate.

Figure 6:
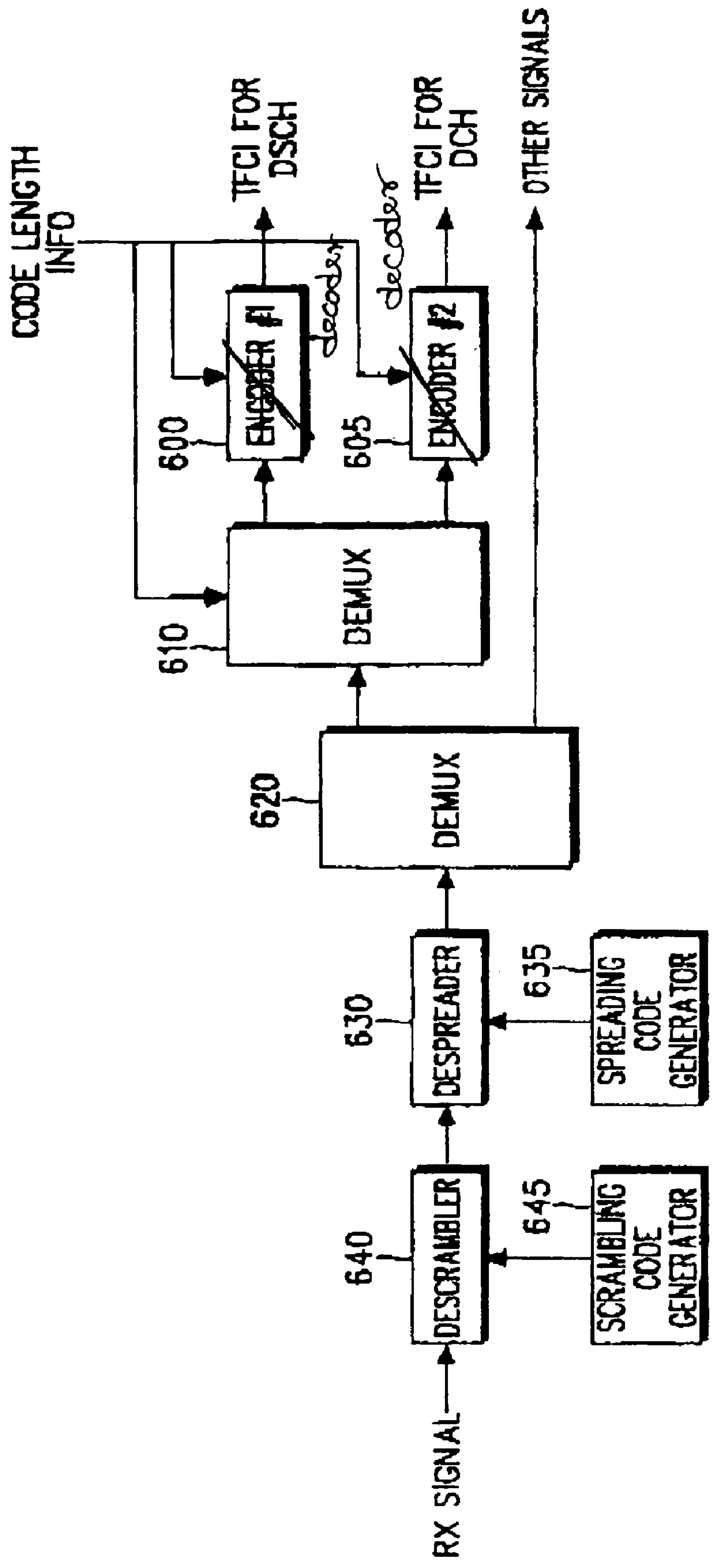
FIG. 6 is a block diagram illustrating a structure of a receiver for decoding coded symbols according to an embodiment of the present invention.

FIG 6. illustrates a structure of a receiver according to an embodiment of the present invention. Referring to FIG. 6, a received signal is descrambled by a descrambler 640 with a scrambling code provided from a scrambling code generator 645. The descrambled symbols are despread by a despreader 630 with a spreading code provided from a despreading code generator 635. The despread received signal is demultiplexed by a demultiplexer 620 into the TFCI bits and other signals such as the TPC bits, pilot bits and a feedback signal. The demultiplexed TFCI symbols are demultiplexed again by a demultiplexer 610 into coded TFCI symbols for the DSCH and coded TFCI symbols for the DCH depending on code length control information, based on an information bit ratio of the TFCI bits for the DSCH to the TFCI bits for the DCH, and then, provided to associated decoders 600 and 605, respectively. The decoders 600 and 605 decode the coded TFCI symbols for the DSCH and the coded TFCI symbols for the DCH, respectively, depending on the code length control information based on the information bit ratio of the TFCI bits for the DSCH to the TFCI bits for the DCH, and then, output the TFCI bits for the DSCH and the TFCI bits for the DCH, respectively.

A structure and operation of a decoder according to an embodiment of the present invention will be described herein below. The decoders 600 and 605 illustrated in FIG. 6 should be structured to decode the TFCI symbols for the DSCH and TFCI symbols for DCH, coded at the various coding rates.

First Embodiment (Decoder)

Figure 7:
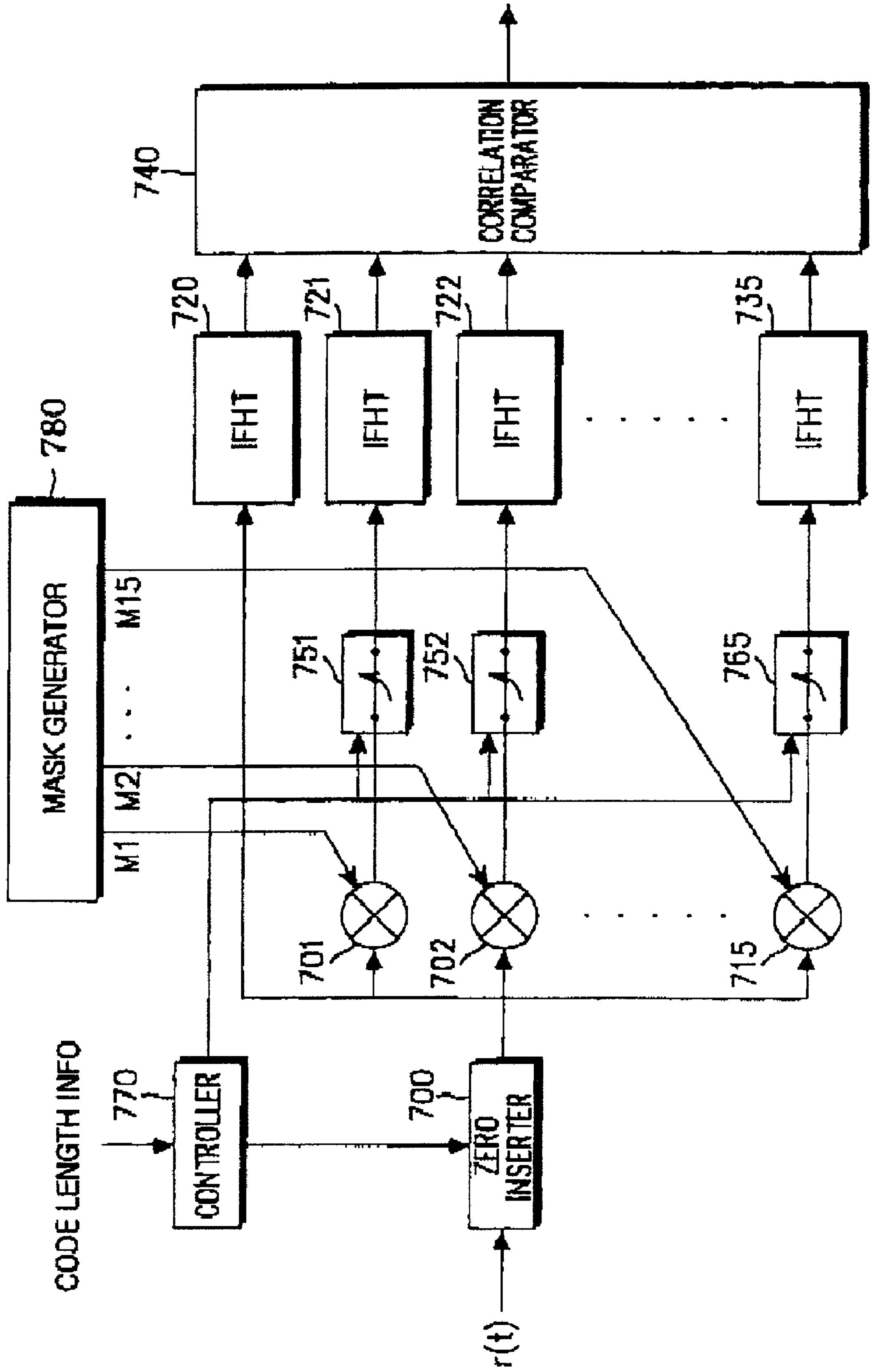
FIG. 7 is a detailed diagram illustrating the decoder shown in FIG. 6.

FIG. 7 illustrates a detailed structure of the decoders 600 and 605. Referring to FIG. 7, received symbols r(t) are provided to the zero inserter 700, and at the same time, code length information is provided to the controller 770. The controller 770 stores puncturing position information based on a code length of the received symbols, and provides the stored puncturing position information to the zero inserter 700. For example, the controller 770 provides the zero inserter 700 with information on 29 puncturing positions for a coding rate (3,1), information on 26 puncturing positions for a coding rate (6,2), information on 23 puncturing positions for a coding rate (9,3), information on 20puncturing positions for a coding rate (12,4), information on 14 puncturing positions for a coding rate (18,6), information on 11 puncturing positions for a coding rate (21,7), information on 8 puncturing positions for a coding rate (24,8), and information on 5 puncturing positions for a coding rate (27,9). For the respective cases, the puncturing positions are the same as given in the description of the encoders. The zero inserter 700 inserts 0s in the puncturing positions according to the puncturing position control information, and then, outputs a symbol stream of length 32. The symbol stream is provided to the inverse fast Hadamard transformer (IFHT) 720 and multipliers 701, 702 and 715. The signals provided to the multipliers 701, 702 and 715 are multiplied by mask functions M1, M2 and M15 generated from the mask generator 780, respectively. The output symbols of the multipliers 701, 702 and 715 are provided to switches 751, 752 and 765, respectively. At this moment, the controller 770 provides the switches 751, 752 and 765 with control information indicating use/nonuse of the mask functions based on the received code length information. For the (3,1), (6,2), (9,3), (12,4) and (18,6) encoders which do not use the mask functions, the switches 751, 752 and 765 are all disconnected according to the control information. For the (21,7) encoder, which uses only one basis codeword, only the switch 751 is connected, and controlled according to the number of mask functions used based on the coding rate. Then, the IFHTs 720, and 751 each perform inverse fast Hadamard transform on their received 32 symbols, and calculate correlation values with Walsh codes and output the highest correlation value, an index of a Walsh code having the highest correlation value among correlation values achieved from the inverse fast Hadamard transform and an index of a mask function multiplied by the received signal. Since the signal provided to the IFHT 720 is not multiplied by any mask function the IFHT 720 does not have mask index.(mask index is zero) The correlation comparator 740 then compares the highest correlation values provided from each of the IFHTs, and outputs decoded bits by concatenating the Walsh index and mask index correspond to the most large correlation value among the highest correlation values. For another implementation, each of the IFHTs output all correlation values achieved by performing inverse fast Hadamard transform. And the comparator compares all correlation value output form the each IFHTs, determines the highest correlation value and outputs the Walsh code index and mask index correspond to the highest correlation value as decoded TFCI bits.

Second Embodiment (Decoder)

Figure 14:
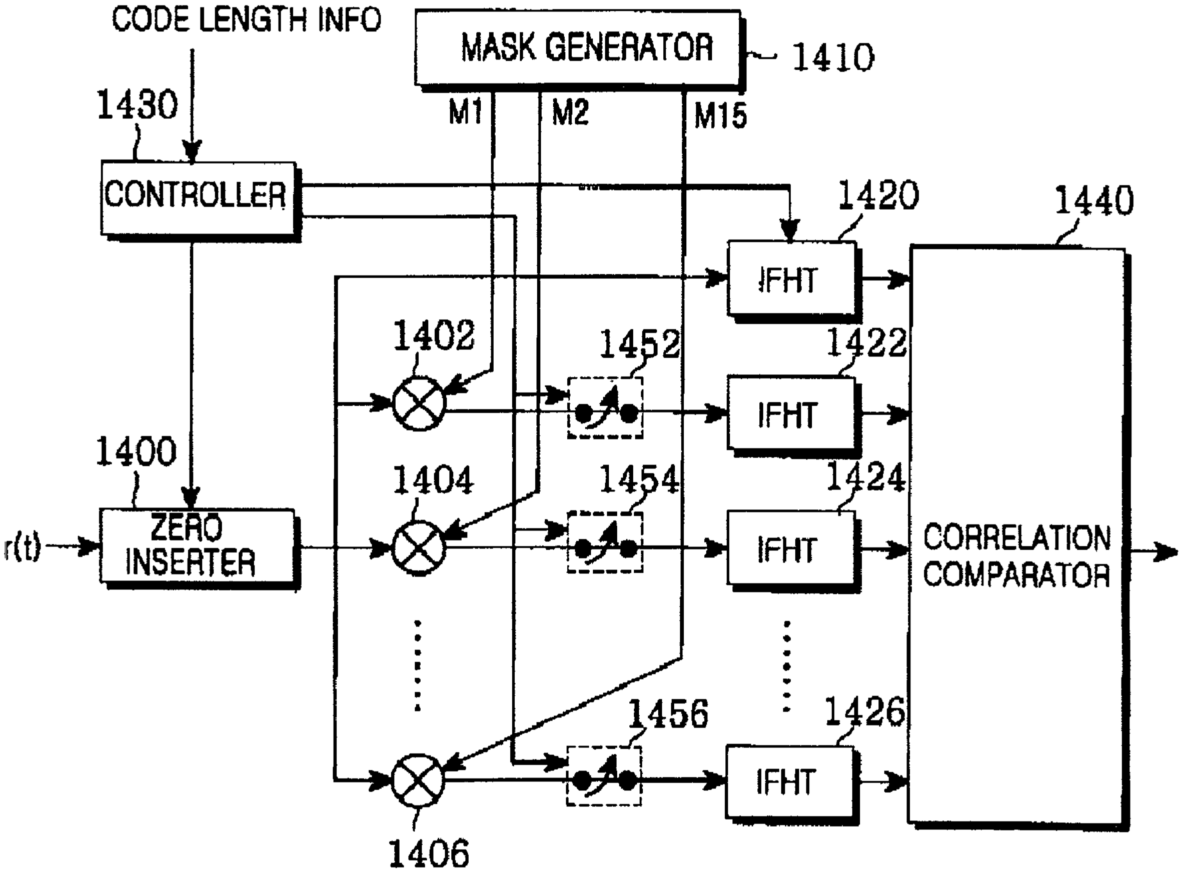
FIG. 14 is a diagram illustrating a structure of a decoder according to an embodiment of the present invention.

FIG. 14 illustrates a structure of the first and second decoders 600 and 605 of FIG. 6. Referring to FIG. 14, coded symbols r(t) received from the encoder are provided to a zero inserter 1400, and at the same time, information on a code length used by the encoder is provided to a controller 1430. The controller 1430 stores information on puncturing positions in association with the code lengths available for the encoder, and provides control information stored therein in association with the code length information to the zero inserter 1400. The code length information indicates the code length or the coding rate used in the encoder, while the control information indicates the puncturing positions. The puncturing positions represent the positions of the symbols pruned to obtain a desired coded symbol length corresponding to the bits received from the encoder. For example, Table 5 illustrates the puncturing positions stored in association with the code lengths.

TABLE 5

| Code Length Info (Coding Rate) | Puncturing bits |
|---|---|
| (3, 1) | F_29 |
| (6, 2) | F_26 |
| (9, 3) | F_23 |
| (12, 4) | F_20 |
| (18, 6) | F_14 |
| (21, 7) | F_11 |
| (24, 8) | F_8 |
| (27, 9) | F_5 |

It is assumed in Table 5 that the code length information indicates the coding rate used in the encoder. As a coding rate (n,k) indicates that k input bits are coded into n symbols, the received symbols have a length n. Further, F_x of Table 5 represents x puncturing bits. The puncturing positions of each code rate are described in the above description. As can be determined from the puncturing position, the control information enables the zero inserter 1400 to maintain the number (32) of output symbols regardless of the code length of the received symbols.

Referring to Table 5, the controller 1430 outputs code length information and information on 29 puncturing positions for a coding rate (3,1), information on 26 puncturing positions for a coding rate (6,2), information on 23 puncturing positions for a coding rate (9,3), information on 20 puncturing positions for a coding rate (12,4), information on 14 puncturing positions for a coding rate (18,6), information on 11 puncturing positions for a coding rate (21,7), information on 8 puncturing positions for a coding rate (24,8), or information on 5 puncturing positions for a coding rate (27,9). For the respective cases, the puncturing positions are the same as given in the description of the encoders.

The zero inserter 1400 inserts Os in the puncturing positions of the received symbols to form a zero-inserted signal according to the control information from the controller 1430, and then, outputs a symbol stream of length 32. The symbol stream is provided to an inverse fast Hadamard transformer (IFHT) 1420 and multipliers 1402, 1404 and 1406. The signals provided to the multipliers 1402, 1404 and 1406 are multiplied by mask functions M1, M2 and M15 generated from the mask generator 1410, respectively. The mask functions generated by the mask generator 1410 are identical to the mask functions used in the encoders. The output symbols of the multipliers 1402, 1404 and 1406 are provided to switches 1452, 1454 and 1456, respectively. At this moment, the controller 1430 provides the switches 1452, 1454 and 1456 with switch control information indicating use/nonuse of the mask functions based on the received code length information.

As a result, the switches 1452, 1454 and 1456 pass the output symbols of the multipliers 1402, 1404 and 1406, respectively. For example, as the mask functions are not used at the coding rates (3,1), (6,2), (9,3), (12,4) and (18,6), the switches 1452, 1454 and 1456 are all disconnected according to the switch control information, thus blocking the output symbols of the multipliers 1402, 1404 and 1406. As only one mask symbol is used at the coding rate (21,7), only the switch 1452 is connected according to the switch control information, and the remaining switches 1404 and 1406 are disconnected. In this manner, the number of mask functions in use is determined according to the coding rate and the switches are controlled depending on the determined number of the mask functions in use. Therefore, when the first and second encoders 600 and 605 of FIG. 6 serve as encoder (3,1), (6,2), (9,3), (12,4), (15,5) and (18,6), only the IFHT 1420 is enabled. The IFHT's 1422, 1424, 1426 can adaptively operate for several code lengths, i.e., several coding rates.

The controller 1430 generates control information indicating a code length or code rate of the received bits and provides the control information to the IFHT 1420. Then, the IFHTs 1420, 1424 and 1426 each perform inverse fast Hadamard transform on 32 symbols received from the zero inserter 1400, and calculate correlations between the symbols and Walsh codes having a specific length. The IFHT 1420 provides a correlation comparator 1440 with an index of the mask function, a highest correlation among the correlations, and an index of the Walsh code having the highest correlation. '0' is provided to the correlation comparator 1440 as an index of the mask function by the IFHT 1420. Providing '0' as an index of the mask function means that the input symbols are multiplied by no mask function. Other IFHTs 1422, 1424 and 1426 perform inverse fast Hadamard transform upon receipt of symbols through associated switches 1452, 1454 and 1456, respectively. The meaning of performing inverse fast Hadamard transform is calculating correlation value with all Walsh code having certain length. After calculating the correlations, the IFHTs 1422, 1424 and 1426 each provide the correlation comparator 1440 with an index of the mask function used, a highest correlation among the correlations, and an index of the Walsh code having the highest correlation. The correlation comparator 1440 then compares the correlations provided from the IFHTs, and combines a mask index having the highest correlation with the Walsh code index.

The IFHTs 1420, 1422, 1424 and 1426 in the decoders should be able to adaptively operate for the coding rate used in the encoders. Reference will be made to an IFHT required when it is used in the decoder corresponding to a Walsh encoder having a variable length in the transmitter. When the decoder operates in association with a (6,2) encoder, an IFHT for a Walsh encoder with a length 8 ($=2^3$) is used. When the decoder operates in association with a (9,3) encoder, an IFHT for a Walsh encoder with a length 16 ($=2^4$) is used. When the decoder operates in association with a (12,4) encoder, an IFHT for a Walsh encoder with a length 16 ($=2^4$) is used. When the decoder operates in association with a (15,5) encoder, an IFHT for a Walsh encoder with a length 16 ($=2^4$) is used. Also, when the decoder operates in association with (18,6), (21,7), (24,8), (27,9) and (30,10) encoders, an IFHT for a Walsh encoder with a length 32 ($=2^5$) is used. In order to operate in the decoder, the IFHT should be able to operate for a variable length. The present invention provides a structure of an IFHT operable for a variable length.

Before a detailed description of an IFHT according to an embodiment of the present invention is given, an operation of a general IFHT will be described with reference to FIG. 16.

Figure 16:
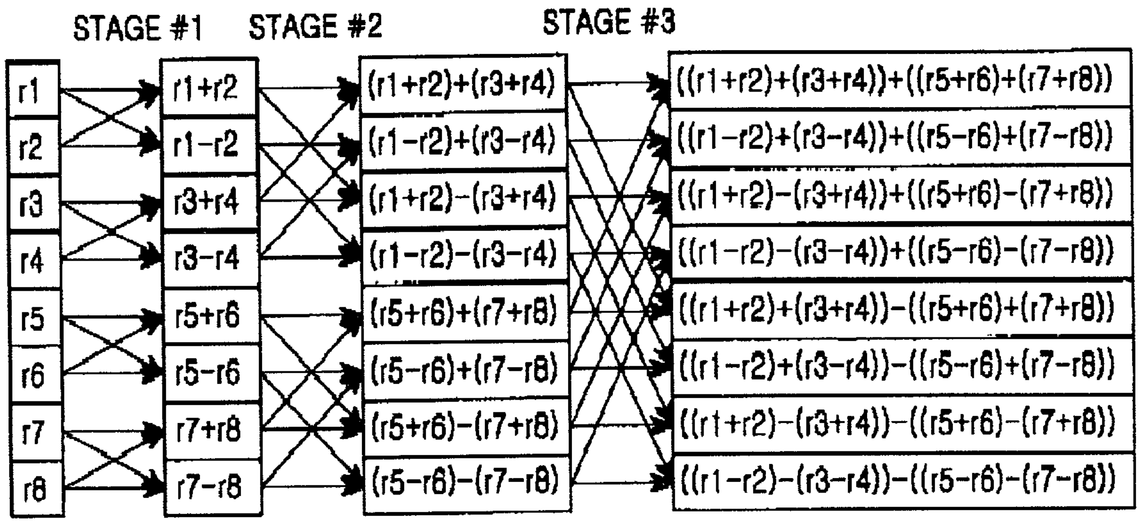
FIG. 16 is a diagram illustrating a general inverse fast Hadamard transform operation for a coded bits with a length 8.

FIG. 16 illustrates an operation of a general IFHT for a Walsh encoder with a length 8. In general, an IFHT for a Walsh encoder with a length $2^n$ includes n stages. In each stage, the IFHT performs a process of adding or subtracting 2 input signals received in association with one row.

Referring to FIG. 16, a stage#1 receives input signals r1, r2, r3, r4, r5, r6, r7 and r8, and then performs addition and subtraction on two adjacent input signals. In a first row, the stage#1 calculates correlations between Walsh codes of length 2 by performing addition and subtraction on the signals r1 and r2. In the same manner, the stage#1 outputs r3+r4 and r3−r4 for r3 and r4; r5+r6 and r5−r6 for r5 and r6; and r7+r8 and r7−r8 for r7 and r8. The 8 output signals of stage #1 are provided to a stage #2. The stage #2 outputs r1+r2)+(r3+r4) by adding r1+r2 and r3+r4, and (r1−r2)+(r3−r4) by adding r1−r2 and r3−r4. Further, the stage#2 outputs (r1+r2)−(r3+r4) by subtracting r3+r4 from r1+r2, and (r1−r2)−(r3−r4) by subtracting r3−r4 from r1−r2. The stage #2 calculates correlations among Walsh codes of length 4 based on the 4 outp (r5+r6)+(r7+r8) by adding r5+r6 and r7+r8, and (r5−r6)+(r7−r8) by adding r5−r6 and r7−r8. Further, the stage #2 outputs (r5+r6)−(r7+r8) by subtracting r7+r8 from r5+r6, and (r5−r6)−(r7−r8) by subtracting r7−r8 from r5−r6. The 8 output signals of stage #2 are provided to a stage #3 where it calculates all the correlations among the Walsh codes of length 8 by performing the same operations as performed in the stage #1 and the stage #2.

For example, an operation of outputting all the correlations among the Walsh codes of length $2^i$ by receiving signals of length $2^n$ can be generalized as follows.

$2^n$ operation signals $t_1$-$t_n$ output from a stage #(i−1) of the IFHT are applied to a stage #i. The $2^n$ operation signals $t_{1\text{-}tn}$ are grouped into $2^{n-i}$ blocks in a reception order, each block having $2^i$ operation signals. That is, a first block is comprised of operation signals $t_1$, to $t_i$, and a second block is comprised of operation signals $t_{i+1}$ to $t_{2i}$. In this way, a final $(2^{n-i})^{th}$ block is comprised of operation signals $t_{n-i}$ to $t_n$. For the operation signals constituting the respective blocks, operation signals corresponding to a desired correlation are provided through a specified operation process. The specified operation process includes a step of adding a $k^{th}$ operation signal among the operation signals constituting one block to its associated $(k+2^{i-1})^{th}$ operation signal and a step of subtracting the $(k+2^{i-1})^{th}$ operation signal from the $k^{th}$ operation signal.

When the stage #i outputs $2^n$ operation signals $t'_1$–$t'_n$ through the inverse fast Hadamard transform operation, first $2^i$ consecutive operation signals $t'_1$–$t'_i$ among the $2^n$ operation signals $t'_1$–$t'_n$, become desired correlation values. That is, it is noted that all correlations between the first $2^i$ input signals $t_1$–$t_i$ out of the $2^n$ input signals $t_1$–$t_n$ and Walsh codes of length $2^i$ are sequentially output.

For example, if it is assumed that the first input signals are r1, r2, r3, r4, r5, r6, r7 and r8, n=3, and i=2, then the operation signals input to the stage #i can be defined as "r1+r2", "r1−r2", "r3+r4", "r3−r4", "r5+r6", "r5−r6", "r7+r8" and "r8". The input operation signals are grouped into $2^{n-i}=2$ blocks in the reception order, each block including $2^i=2^2=4$ input signals. Therefore, the first block is comprised of "r1+r2", "r1−r2", "r3+r4" and "r3−r4", and the second block is comprised of "r5+r6", "r5−r6", "r7+r8" and "r7−r8". By adding and subtracting the $k^{th}$ operation signal and the $(k+2_{i-1})^{th}$ operation signal in each block, outputs 4 operation signals are output by each block. For example, if k=1, a first operation signal "r1+r2" is added to and subtracted by the $(k+2_{i-1})^{th}$ signal, i.e., a third operation signal "r3+r4", thus outputting two operation signals "r1+r2" and "r1−r2". As a result, "(r1+r2)+(r3+r4)", "(r1+r2)−(r3+r4)", "(r1−r2)+(r3−r4)" and "(r1−r2)−(r3−r4)" are output by "r1+r2", "r1−r2", "r3+r4" and "r3−r4" constituting the first block, and "(r5+r6)+(r7+r8)", "(r5+r6)−(r7+r8)", "(r5−r6)+(r7−r8)" and "(r5−r6)−(r7−r8)" are output by "r5+r6", "r5−r6", "r7+r8" and "r7−r8" constituting the second block. However, among the 8 output operation signals, only the 4 operation signals "(r1+r2)+(r3+r4)", "(r1+r2)−(r3+r4)", "(r1−r2)+(r3−r4)", "(r1−r2)−(r3−r4)" output by the first block become correlation values by the inverse fast Hadamard transform of the stage #i.

Figure 15:
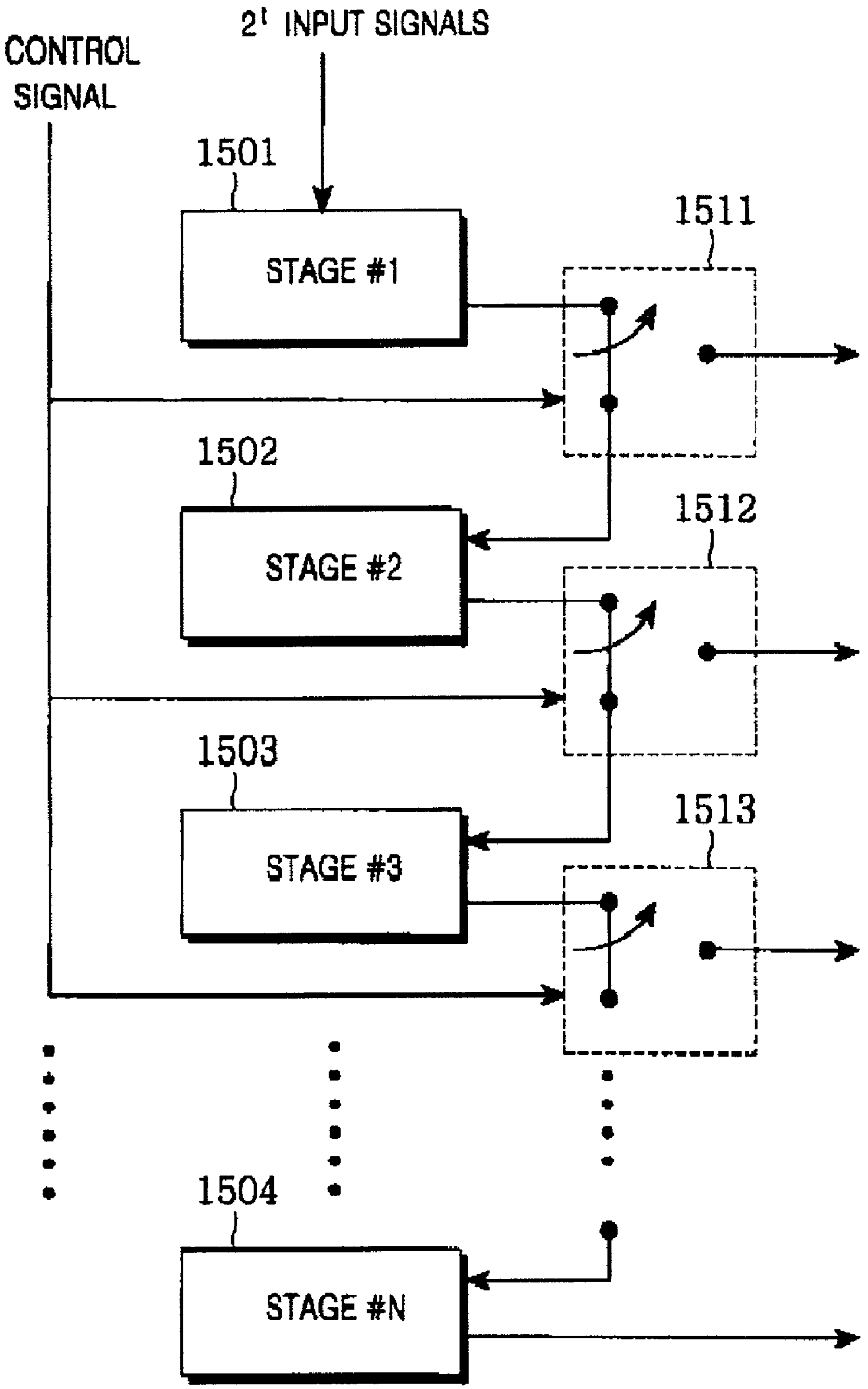
FIG. 15 is a diagram illustrating an inverse fast Hadamard transformer having a variable length according to an embodiment of the present invention.

FIG. 15 illustrates an operation of the IFHT 1420 of FIG. 14, based on the inverse fast Hadamard transform process described in conjunction with FIG. 16. Specifically, FIG. 15 illustrates an overall scheme for an operation of the IFHT 1420 for the decoders 600 and 605 serving as (3,1), (6,2), (9,3), (12,4), (15,5) and (18,6) decoders. With reference to FIG. 15, a structure and operation of an IFHT capable of variably performing inverse fast Hadamard transform on Walsh codes of up to a maximum length $2^n$ will be described in detail based on the operation characteristic of the IFHT illustrated in FIG. 16.

As soon as $2_t$ input signals are applied to a stage #1 of the IFHT, a length control signal is simultaneously provided to all of switches 1511, 1512 and 1513. The control signal is generated to perform inverse fast Hadamard transform on the $2^t$ input signals only up to a stage #t. Therefore, switches for switching outputs of the stage #1 to a stage #(t−1) switch their outputs to the next stages in response to the control signal. However, a switch for switching an output of the last stage #t is switched to provide its output as a final correlation in response to the control signal, rather than providing the output to a next stage #(t+1).

For example, if t=1, two input signals are applied to the stage #1. The stage #1 performs the same operation as performed in the stage #1 of FIG. 16, thus outputting 2 operation signals. The operation signals are provided to the switch 1511 for switching the outputs of the stage #1 to the stage #2. In this case, the switch 1511 outputs the operation signals as correlations between the two input signals in response to the control signal, rather than providing the operation signals to the stage #2.

Meanwhile, if t=3 as illustrated in FIG. 16, eight operation signals output from the stage #1 are applied to the stage #2 by the switch 1511 in response to the control signal. The stage #2 performs the same operation as performed in the stage #2 of FIG. 16 on the 8 operation signals received, thus outputting 8 operation signals. The operation signals output from the stage #2 are applied to a stage #3 by the switch 1512 in response to the control signal. The stage #3 performs the same operation as performed in the stage #3 of FIG. 16 on the 8 operation signals received. The 8 operation signals output from the stage #3 are provided to a switch 1513. In this case, the switch 1513 outputs the operation signals as correlations among the 8 operation signals in response to the control signal, rather than providing the operation signals to a stage #4.

Figure 17:
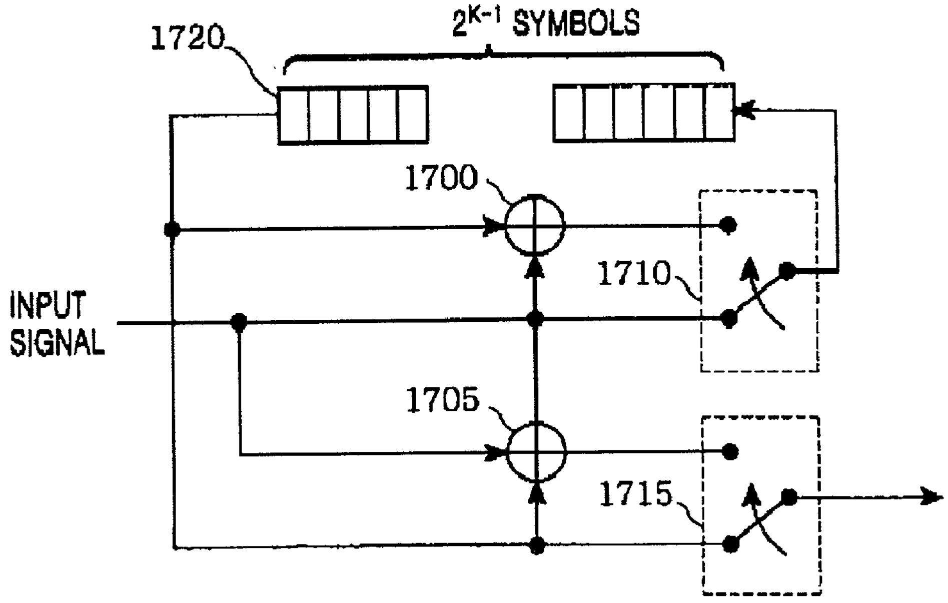
FIG. 17 is a diagram illustrating a structure of a device used in each stage of FIG. 15.

FIG. 17 illustrates a hardware structure of a stage #k as illustrated in FIG. 15 according to an embodiment of the present invention. Referring to FIG. 17, a subtracter 1700 subtracts an input symbol from an output symbol of a memory 1720. An adder 1705 adds the input symbol to the output symbol of the memory 1720. A first switch 1710 switches the input symbol or an output symbol of the subtracter 1700 to an input end of the memory 1720 in response to a control signal. A second switch 1715 switches the output symbol of the memory 1720 or an output symbol of the adder 1705 to the input end of the memory 1720 in response to the control signal. The memory 1720 can be realized with a buffer having a specific length, and sequentially stores as many symbols as its length, received from the first switch 1710. The length of the memory 1720 is determined depending on the number of symbols constituting the input signal.

In operation, a first symbol among $2_k$ symbols constituting the input signal is initially applied to the subtracter 1700, the adder 1705 and the first switch 1710. In this state, the first switch 1710 is switched to a node to which the input symbol is applied, and thus provides the input symbol to the memory 1720. Further, an output node of the memory 1720 is connected to a final output node by the second switch 1715. Next, when a second symbol is input to the stage #k, the input symbol is applied to the subtracter 1700, the adder 1705 and the first switch 1710. Then, the first switch 1710 is switched to the node to which the input symbol is applied. As a result, the first input symbol previously stored in the memory 1720 is shifted to a next memory area, and at the same time, the second input symbol is stored in the memory area where the first input symbol was previously stored.

When a $(2_{k-1}+1)$th input symbol is received after $2^{k-1}$ input symbols are stored in the memory 1720 in this manner, the $(2_{k-1}+1)^{th}$ input symbol is provided to the subtracter 1700, the adder 1705 and the first switch 1710. Then, the first switch 1710 is switched to the subtracter 1700, and the second switch 1715 is switched to the adder 1705. Further, the first input symbol stored in the memory 1720 is provided to the subtracter 1700, the adder 1705 and the second switch 1715. At the same time, the $2^{k-1}$ input symbols stored in the memory 1720 are shifted left by one symbol. The subtracter 1700 then subtracts the $(2^{k-1}+1)^{th}$ new input symbol from the first input symbol output from the memory 1720, and provides its output symbol to the memory 1720 through the first switch 1710. At the same time, the adder 1705 adds the first input symbol received from the memory 1720 to the $(2^{k-1}+1)$ new input symbol, and provides its output symbol to the final output node through the second switch 1715.

When a $(2^{k-1}+1)^{th}$ input symbol is received after the above operation has been performed $2^{k-1}$ times, the $(2^{k-1}+1)^{th}$ new input symbol is provided to the subtracter 1700, the adder 1705 and the first switch 1710. At the same time, the second switch 1715 is switched to the memory 1720, and the first switch 1710 is switched to the input signal node. As a result, a symbol determined by subtracting the $(2^{k-1}+1)^{th}$ input symbol from the first input symbol provided from the memory 1720 is output through the second switch 1715. At the same time, the symbols stored in the memory 1720 are shifted left by one symbol, and the $(2^{k-1}+1)^{th}$ new input symbol is provided to the rightmost memory area of the memory 1720 through the first switch 1710. The input symbols are stored as many symbols as the buffer length by repeating the above process, thus completing an operation of the stage #k.

Now, a method for achieving the fourth and fifth objects of the present invention will be described with reference to FIGS. 10 to 13.

Figure 10:
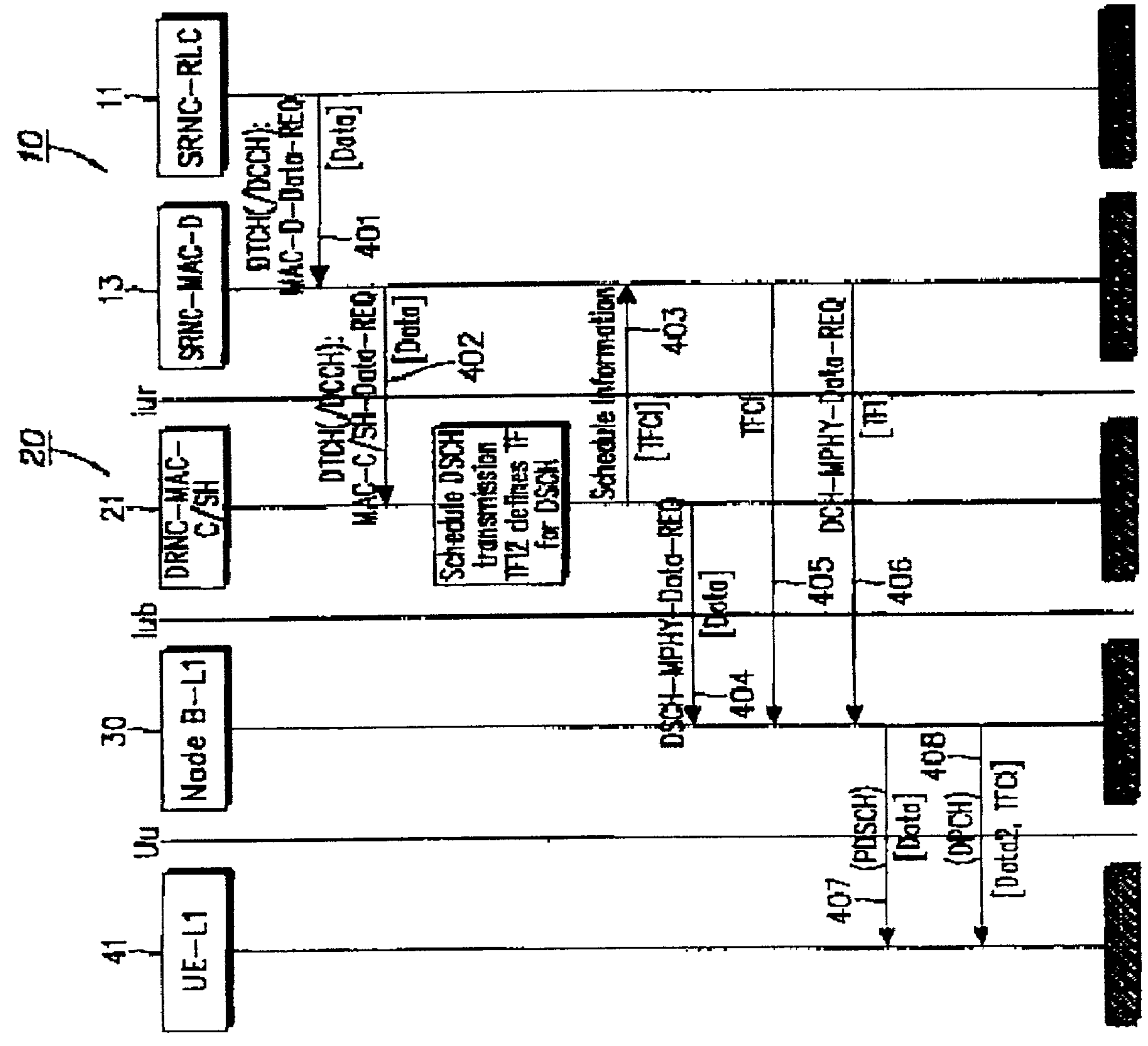
FIG. 10 is a flow diagram illustrating a procedure for exchanging signaling messages and data between a Node B and RNCs for the logical split technique wherein an SRNC is not identical to a DRNC.
Figure 11:
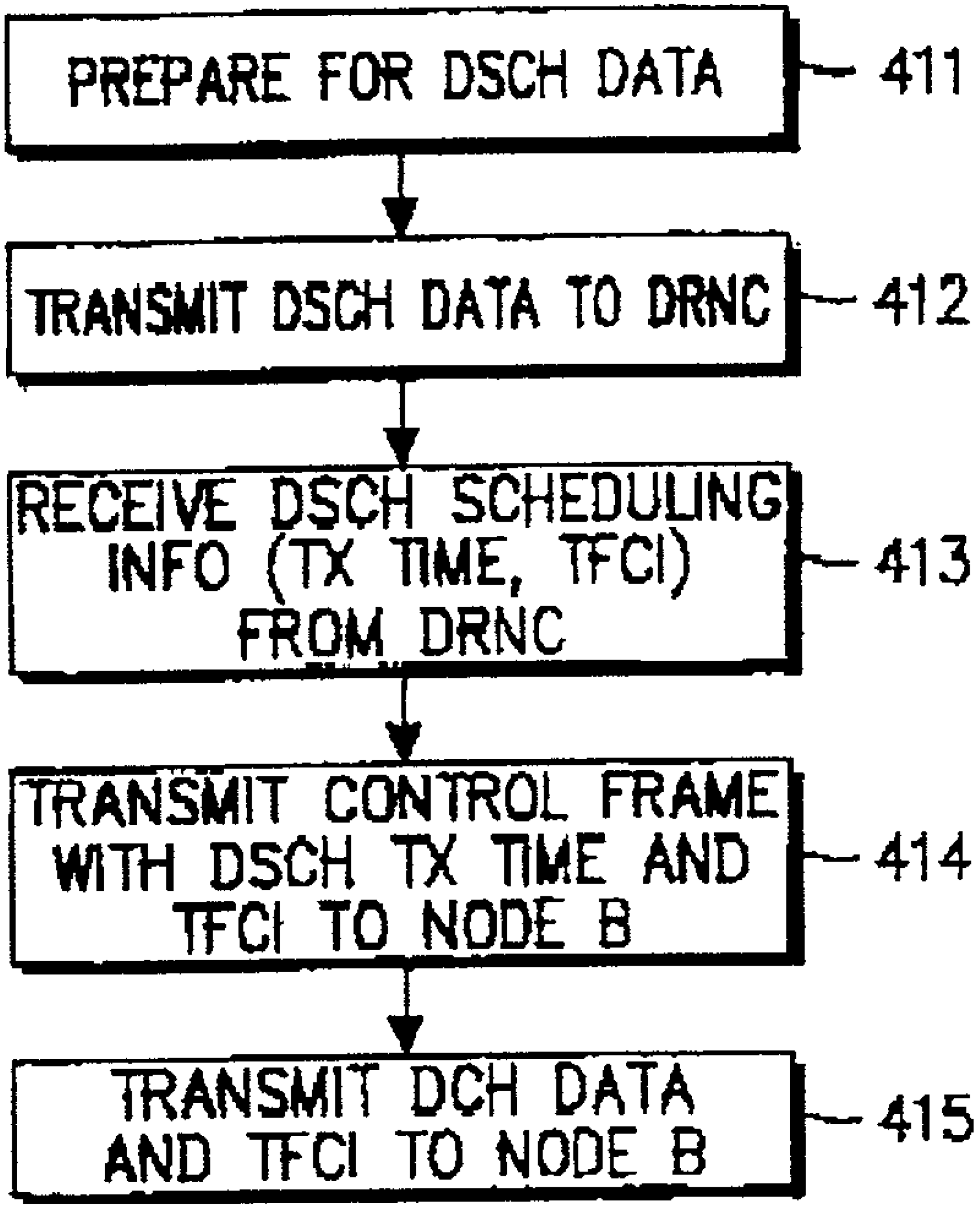
FIG. 11 is a flow chart illustrating an operation of the SRNC according to an embodiment of the present invention.
Figure 12:
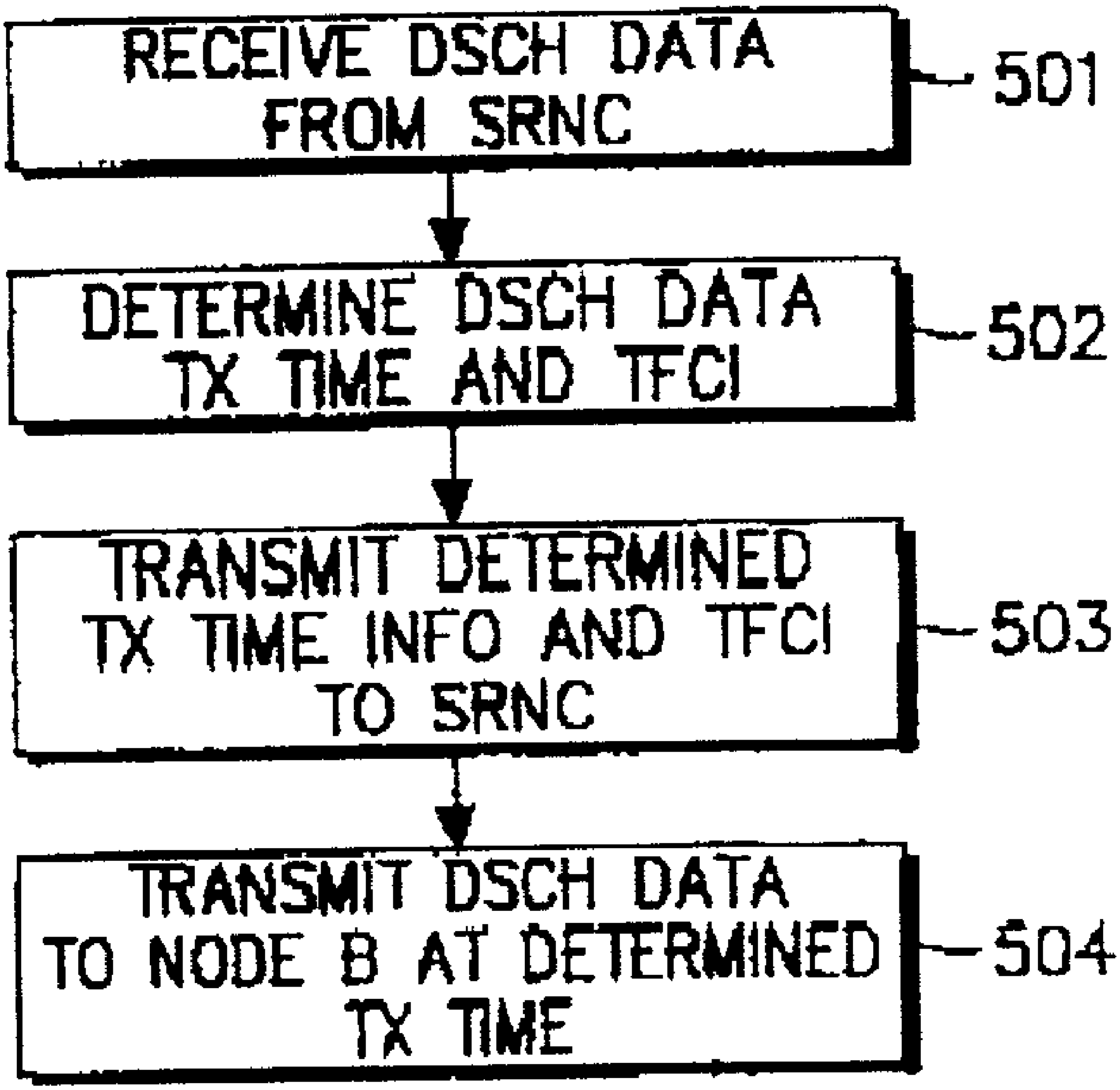
FIG. 12 is a flow chart illustrating an operation of the DRNC according to an embodiment of the present invention.
Figure 13:
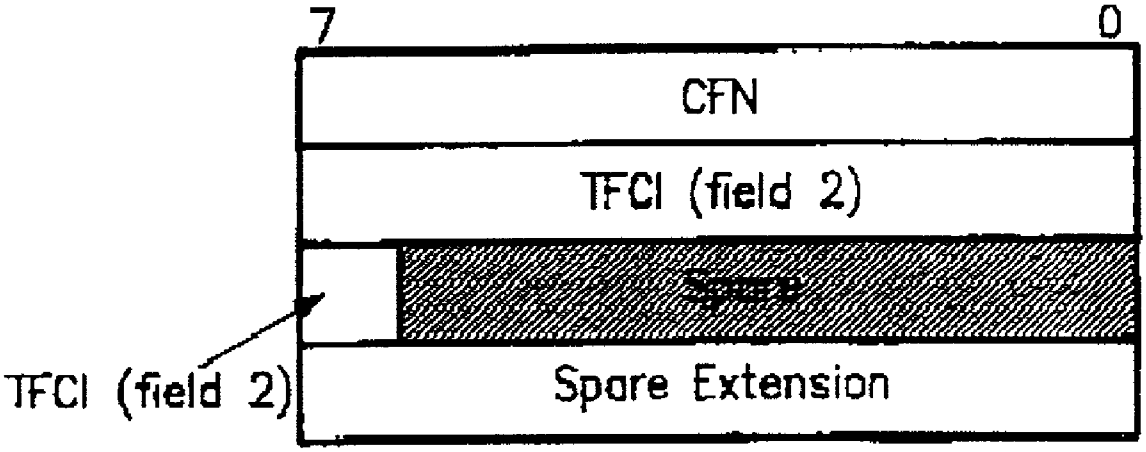
FIG. 13 is a diagram illustrating a structure of a control frame including information transmitted from the DRNC to the SRNC, shown in FIG. 8.

FIG. 10 illustrates a procedure for exchanging signaling messages and data between a Node B and RNCs for the logical split technique. FIG. 11 illustrates an operation of the SRNC according to an embodiment of the present invention. FIG. 12 illustrates an operation of the DRNC according to an embodiment of the present invention, and FIG. 13 illustrates a structure of a control frame including information transmitted from the DRNC to the SRNC, shown in FIG. 8.

Referring first to FIG. 10, when there is DSCH data to transmit, RLC 11 of the SRNC 10 transmits the DSCH data to MAC-D 13 of the SRNC 10 in step.401. Upon receipt of the DSCH data from the RLC 11, the MAC-D 13 of the SRNC 10 transmits the received DSCH data to MAC-C/SH 21 of the DRNC 20 in step 402. At this moment, the DSCH data is transmitted using a frame protocol on the lur. Upon receipt of the DSCH data, the MAC-C/SH 21 of the DRNC 20 determines (schedules) a transmission time of the DSCH data and then transmits the determined transmission time information along with TFCI for the DSCH data to the MAC-D 13 of the SRNC 10, in step 403. After transmitting the transmission time information along with the TFCI for the DSCH data to the MAC-D 13 of the SRNC 10 in the step 403, the MAC-C/SH 21 of the DRNC 20 transmits the DSCH data to L1 30 of the Node B in step 404. At this moment, the DSCH data is transmitted at the transmission time determined (scheduled) in the step 403.

Upon receipt of the transmission time information along with the TFCI for the DSCH data from the MAC-C/SH 21 of the DRNC 20, the MAC-D 13 of the SRNC 10 transmits the TFCI along with the transmission time information to the L1 30 of the Node B before the transmission time, in step 405. At this moment, the data is transmitted using a control frame. Further, the MAC-D 13 of the SRNC 10 determines DCH data and TFCI for the DCH, and transmits them to the L1 30 of the Node B, in step 406. The DSCH data transmitted in the step 404 and the TFCI transmitted in the step 405 are related to the transmission time determined in the step 403. That is, the TFCI transmitted in the step 405 is transmitted to the UE over the DPCCH at a frame immediately before the DSCH data is transmitted over the PDSCH in the step 404. In the steps 404, 405 and 406, the data and TFCI are transmitted using a frame protocol. Particularly, in the step 406, the TFCI is transmitted through a control frame. Upon receipt of the data and TFCI transmitted in the steps 404, 405 and 406, the L1 30 of the Node B transmits the DSCH data to LI 41 of the UE over the DPSCH in step 407. Further, the L1 30 of the Node B transmits the TFCI to the L1 41 of the UE over the DPCH in step 408. At this moment, the L1 30 of the Node B creates one TFCI using the TFCIs or TFIs received in the steps 405 and 406, and then transmits the created TFCI using the DPCCH.

FIG. 11 illustrates an operation of the SRNC according to an embodiment of the present invention. Referring to FIG. 11, in step 411, the SRNC prepares for DSCH data to transmit. After preparation for the DSCH data to transmit, the SRNC transmits the DSCH data to the DRNC through the RLC and the MAC-D in step 412. After transmission of the DSCH data to the DRNC in the step 412, the SRNC receives scheduling information for the transmitted DSCH data, i.e., the transmission time information and the TFCI, in step 413. At this moment, the scheduling information can be received using a control frame.

FIG. 13 illustrates a format of a control frame filled with information transmitted from the DRNC to the SRNC. Referring to FIG. 13, a CFN (Connection Frame Number) indicates a unique number of the frame to be transmitted, and this is the information on the transmission time of the DSCH data. Further, TFCI (field #2 ) of FIG. 13 indicates TFCI information for the DSCH data to be transmitted.

Referring back to FIG. 11, in step 414, the SRNC transmits to the Node B a control frame filled with the transmission time information and the TFCI information for the DSCH. The control frame arrives at the Node B before the transmission time. In step 415, the SRNC transmits DCH data along with the TFCI for the DCH to the Node B.

FIG. 12 illustrates an operation of the DRNC according to an embodiment of the present invention. Referring to FIG. 12, in step 501, the DRNC receives the DSCH data transmitted by the SRNC in the step 413 of FIG. 11. Upon receipt of the DSCH data, the DRNC schedules transmission times of the DSCHs received from a plurality of RNCs in step 502. That is, the DRNC determines (schedules) transmission times where the DSCHs received from a plurality of the RNCs and the DSCH created by the DRNC itself are to be transmitted, and also schedules TFI or TFCI considering a channel to be used during the transmission. After scheduling the transmission times and the TFI or TFCI in the step 502, the DRNC transmits the scheduled transmission time information and TFCI information to the SRNC using the control frame in step 503. The control frame transmitted at this moment has the structure of FIG. 8. After transmission of the scheduled time information and TFCI information, the DRNC transmits the DSCH data to the Node B at the scheduled time in step 504.

As described above, the embodiment of the present invention can encode/decode various types of the TFCI bits using a single encoder/decoder structure. In addition, the embodiment multiplexes the TFCI symbols encoded in the different coding techniques, such that the TFCI symbols should be uniformly distributed before transmission. For the 10 input bits, the TFCI coding is performed in a selected one of the ratios of 1:9, 2:8, 3:7, 4:6, 5:5, 6:4, 7:3, 8:2, and 9:1 depending on the transmission data bits of the DSCH and the DCH. In addition, if the SRNC is separated from the DRNC in the logical split mode, the embodiment of the present invention can transmit scheduling information from the MAC-C/SH of the DRNC to the MAC-D of the SRNC. In addition, the embodiment can transmit a signaling message so as to separately use the hard split technique and the logical split technique, which are different techniques for transmitting the TFCI for the DSCH. Finally, the present invention adaptively applies inverse fast Hadamard transform according to coding rates, thus simplifying a procedure for measuring the correlations.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for decoding a variable length TFCI (Transport Format Combination Indicator) bits for a DSCH (Downlink Shared Channel) or for a DCH (Dedicated Channel) in a reception device for a mobile communication system, which receives a signal of encoded TFCI bits for the DSCH or the TFCI bits for the DCH, encoded with orthogonal codes, comprising the steps of:

determining inverse fast Hadamard transform (IFHT) stages based on the length of the TFCI bits;

inserting "0"s in the received signal at a predetermined positions to form a zero-inserted signal;

sequentially performing inverse fast Hadamard transform on the zero-inserted signal up to the determined IFHT stages; and after completion of the inverse fast Hadamard transform by the determined IFHT stages, outputting index of an orthogonal code of which correlation value is most large than other correlation value achieved by the determined IFHT stage as decoded TFCI bits.

2. The method as claimed in claim 1, wherein the each of the determined IFHT stages n are a least value satisfying ($a \leqq 2^n$) for a code length "a".

3. The method as claimed in claim 2, wherein the determined IFHT stage n is one of 1, 2, 3, 4 and 5.

4. The method as claimed in claim 1, wherein the length of the zero-inserted signal is identical to a length of the orthogonal codes used for encoding the TFCI bits.

5. An apparatus for decoding a variable length TFCI bits for a DSCH or for a DCH in a reception device for a mobile communication system, which receives a signal of encoded TFCI bits for the DSCH or the TFCI bits for the DCH, encoded with orthogonal codes, the apparatus comprising:

a controller for informing a code length information and zero inserting positions to an inserter;

wherein the inserter inserts "0"s in the received signal at the zero inserting position to form a zero-inserted signal;

an inverse fast Hadamard transformer (IFHT) having multiple operating stages, for calculating correlation values of the zero-inserted signal with the orthogonal codes wherein, the IFHT stop performing inverse fast Hadamard transform at a given operating stage correspond to the code length information; and a comparator for comparing the correlation values and outputting a Walsh index correspond to the highest correlation value.

6. The apparatus as claimed in claim 5, wherein each of the given IFHT stages n are a least value satisfying ($a \leqq 2^n$) for the code length "a".

7. The apparatus as claimed in claim 5, wherein the given stage is one of 1, 2, 3, 4 and 5.

8. The apparatus as claimed in claim 5, wherein the length of the zero-inserted signal is identical to a length of an orthogonal code used for encoding the TFCI bits.

* * * * *